US011618489B2

(12) United States Patent
Kalinowski et al.

(10) Patent No.: US 11,618,489 B2
(45) Date of Patent: *Apr. 4, 2023

(54) PALLET SLED

(71) Applicant: REHRIG PACIFIC COMPANY, Los Angeles, CA (US)

(72) Inventors: Dane Gin Mun Kalinowski, Foothill Ranch, CA (US); William Robinson, Los Angeles, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 16/801,349

(22) Filed: Feb. 26, 2020

(65) Prior Publication Data

US 2020/0283045 A1    Sep. 10, 2020

Related U.S. Application Data

(60) Continuation of application No. 16/533,212, filed on Aug. 6, 2019, now Pat. No. 10,589,769, which is a
(Continued)

(51) Int. Cl.
*B62B 3/02*        (2006.01)
*B62B 5/06*        (2006.01)
(Continued)

(52) U.S. Cl.
CPC ............... *B62B 3/02* (2013.01); *B62B 3/001* (2013.01); *B62B 3/0606* (2013.01); *B62B 3/0625* (2013.01); *B62B 3/0631* (2013.01); *B62B 3/008* (2013.01); *B62B 5/067* (2013.01); *B62B 2203/20* (2013.01)

(58) Field of Classification Search
CPC ....... B62B 3/06; B62B 3/0606; B62B 3/0625; B62B 3/0631
See application file for complete search history.

(56) References Cited

U.S. PATENT DOCUMENTS 2,110,424 A * 3/1938 Quayle ................. B62B 3/0618
                                                 414/710
2,121,764 A * 6/1938 Quayle ................. B62B 3/0625
                                                 254/1 OC
(Continued)

FOREIGN PATENT DOCUMENTS

GB           419264         11/1934
GB           2402921 A     12/2004

OTHER PUBLICATIONS

Patent Examination Report for New Zealand Application No. 732272 dated Oct. 11, 2021.

*Primary Examiner* — Katy M Ebner
(74) *Attorney, Agent, or Firm* — Carlson, Gaskey & Olds, P.C.

(57) ABSTRACT

A pallet sled includes an upper frame including spaced-apart arms adapted to receive feet of a pallet therebetween. A lower frame supports the upper frame. A plurality of pivotable arms connect the lower frame to the upper frame. A handle is pivotably connected to the lower frame and the upper frame, such that pivoting the handle selectively raises and lowers the upper frame relative to the lower frame.

22 Claims, 37 Drawing Sheets

Related U.S. Application Data division of application No. 15/606,598, filed on May 26, 2017, now Pat. No. 10,464,586.

(60) Provisional application No. 62/341,833, filed on May 26, 2016.

(51) Int. Cl.
  *B62B 3/06* (2006.01)
  *B62B 3/00* (2006.01)

(56) References Cited

U.S. PATENT DOCUMENTS

| | | | | |
|---|---|---|---|---|
| 2,130,939 A * | 9/1938 | Williams | | B62B 3/0631 188/317 |
| 2,234,925 A * | 3/1941 | Hastings, Jr. | | B62B 3/0625 280/43.12 |
| 2,251,606 A * | 8/1941 | Wobbe | | B62B 3/0631 254/1 OC |
| 2,424,417 A * | 7/1947 | Quayle | | B62B 3/0625 254/2 C |
| 2,506,381 A * | 5/1950 | Nilsson | | B62B 3/0631 254/1 OC |
| 2,511,073 A * | 6/1950 | McCandless | | B62B 3/0625 254/1 OC |
| 2,546,539 A * | 3/1951 | Fehn | | B62B 3/0631 280/43.13 |
| 2,628,068 A * | 2/1953 | Sehnert | | B62B 3/0625 414/458 |
| 2,822,944 A * | 2/1958 | Blomgren | | B62B 3/0631 254/1 OR |
| 2,840,346 A * | 6/1958 | Du Moulin | | B62B 3/0625 254/8 C |
| 2,959,311 A * | 11/1960 | Rosenow | | B62B 3/0625 414/495 |
| 3,059,904 A * | 10/1962 | Kimball | | B62B 3/0625 254/1 OC |
| 3,074,691 A * | 1/1963 | Knapp | | B66D 3/14 254/5 C |
| 3,129,923 A * | 4/1964 | Kikuchi | | B62B 3/0625 254/1 OR |
| 3,306,579 A * | 2/1967 | Campbell | | B62B 3/0625 254/1 OR |
| 5,405,236 A * | 4/1995 | Sundstrom | | B66F 7/0625 414/495 |
| 5,449,266 A * | 9/1995 | Evans | | B62B 5/0083 254/1 OR |
| 6,003,841 A * | 12/1999 | Aisenbrey | | B66F 7/0641 254/1 OR |
| 6,186,728 B1 * | 2/2001 | Michaud | | B62B 3/0643 254/1 OR |
| 6,648,578 B1 * | 11/2003 | Rouse | | B60P 1/02 414/812 |
| 9,309,096 B2 * | 4/2016 | Mariotti | | B66F 9/065 |
| 10,464,586 B2 * | 11/2019 | Kalinowski | | B62B 3/0625 |
| 10,589,769 B2 * | 3/2020 | Kalinowski | | B62B 3/02 |
| 2015/0225215 A1 * | 8/2015 | King | | B62B 3/0606 254/1 OR |
| 2017/0341667 A1 * | 11/2017 | Kalinowski | | B62B 3/02 |
| 2018/0057032 A1 * | 3/2018 | Brewer | | B62B 3/0631 |
| 2018/0319212 A1 * | 11/2018 | Lindgren | | B60B 29/001 |

\* cited by examiner

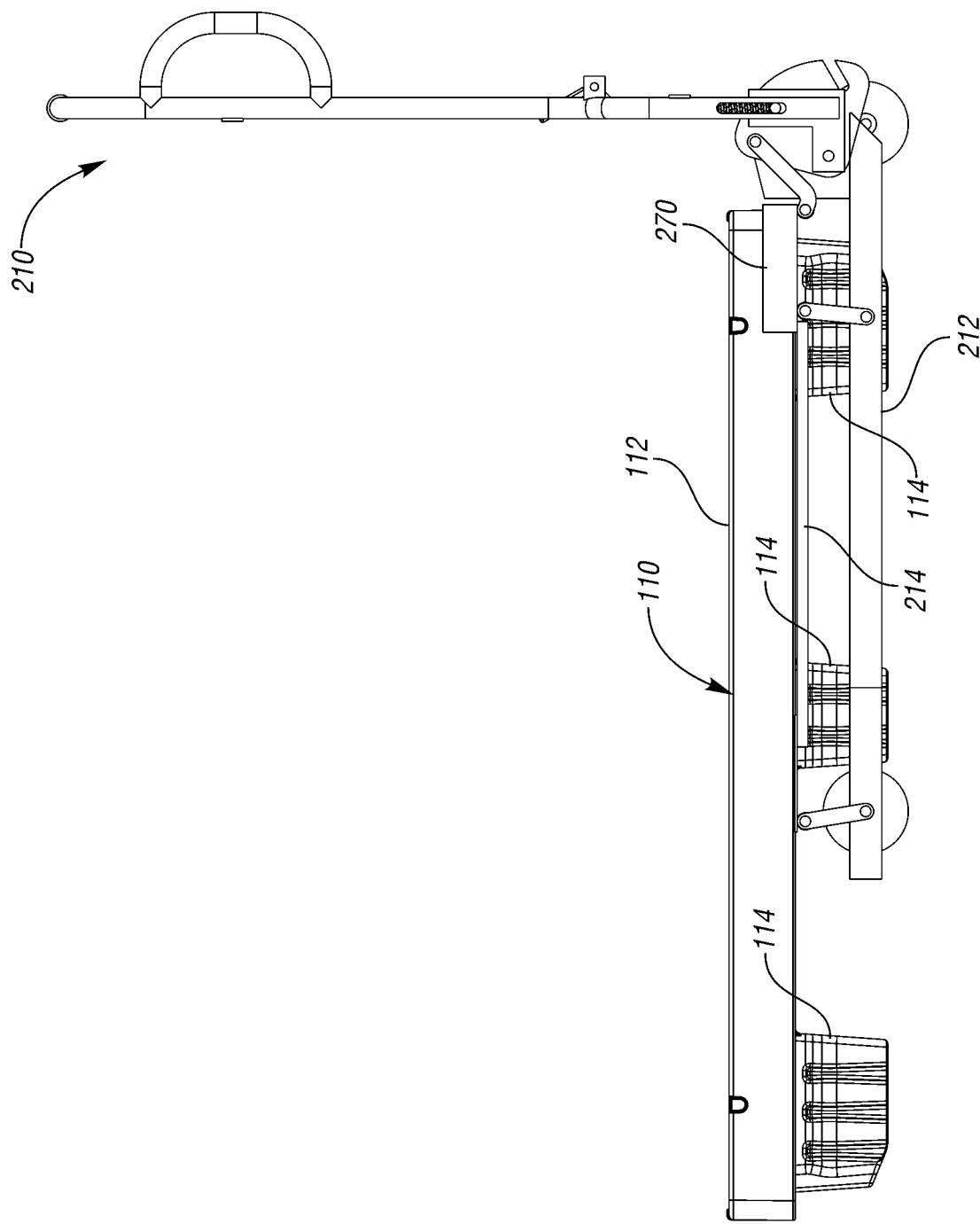

PALLET SLED

CROSS-REFERENCED TO RELATED APPLICATION

This application is a continuation of U.S. application Ser. No. 16/533,212, which was filed on Aug. 6, 2019, which is a division of U.S. application Ser. No. 15/606,598, which was filed on May 26, 2017, which claims priority to U.S. Provisional Application No. 62/341,833, which was filed on May 26, 2016.

BACKGROUND

Pallets are often used to ship goods into stores. Loaded pallets on trucks are brought into stores and may be unloaded onto shelves in refrigerators or freezers. Existing means for lifting and moving pallets can be large, heavy, expensive and difficult to maneuver. Powered lifts may have heavy and expensive motors or hydraulics. Many lifts are too large to be wheeled directly into a freezer or refrigerator at a store, or may be difficult to maneuver once there.

SUMMARY

A pallet sled includes an upper frame including spaced-apart arms adapted to receive feet of a pallet therebetween. A lower frame supports the upper frame. A plurality of pivotable arms connect the lower frame to the upper frame. A handle is pivotably connected to the lower frame and the upper frame, such that pivoting the handle selectively raises and lowers the upper frame relative to the lower frame.

The sled provides a small, lightweight manual, non-powered lift for lifting pallets. The sled can be used to deliver loaded pallets into stores, such as into store refrigerator or freezers, because the sled is small and maneuverable. The sled is particularly adapted to the "half-pallets" that have been used to move goods from a truck into a refrigerator/freezer at a store.

BRIEF DESCRIPTION OF THE DRAWINGS

FIG. 37 is a side view of the pallet sled and pallet of FIG. 36.

DETAILED DESCRIPTION OF PREFERRED EMBODIMENTS

Figure 1:
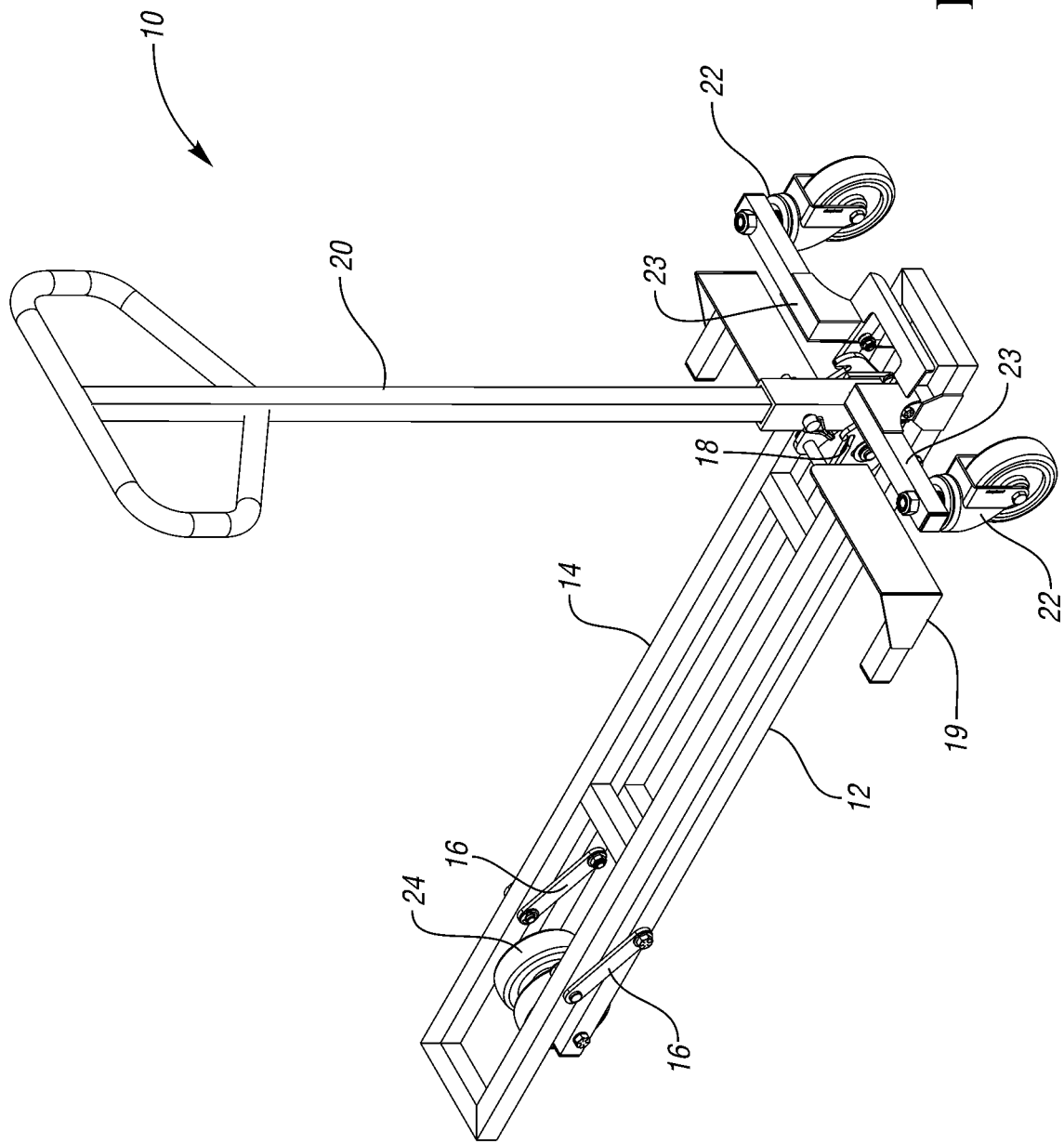
FIG. 1 is a front perspective view of a pallet sled according to a first embodiment.

A merchandiser sled 10 is shown in FIG. 1. The sled 10 is used for lifting and moving pallets, particularly half-pallets. The merchandiser sled 10 includes a lower frame 12 and upper frame 14 connected by pivot arms 16 at a rearward end and by a lift mechanism 18 at a forward end. A U-shaped cradle 19 is mounted at the forward end of the upper frame 14 and opens rearwardly. A handle 20 connects to the lift mechanism 18. A pair of casters 22 support the lower frame 12 at the ends of arms 23 at the forward end. A pair of wheels 24 support the lower frame 12 at the rearward end.

Figure 2:
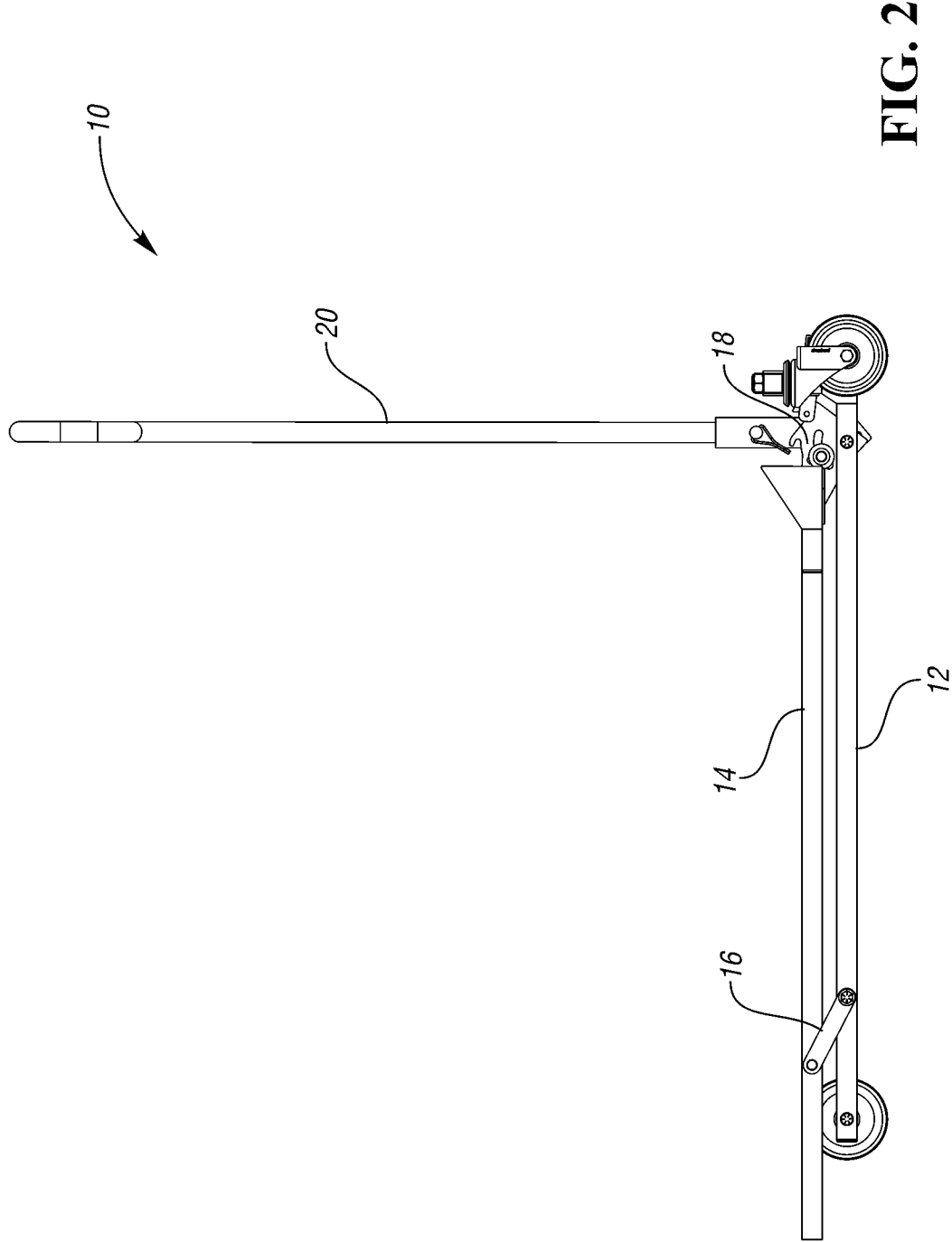
FIG. 2 is a side view of the sled of FIG. 1.
Figure 3:
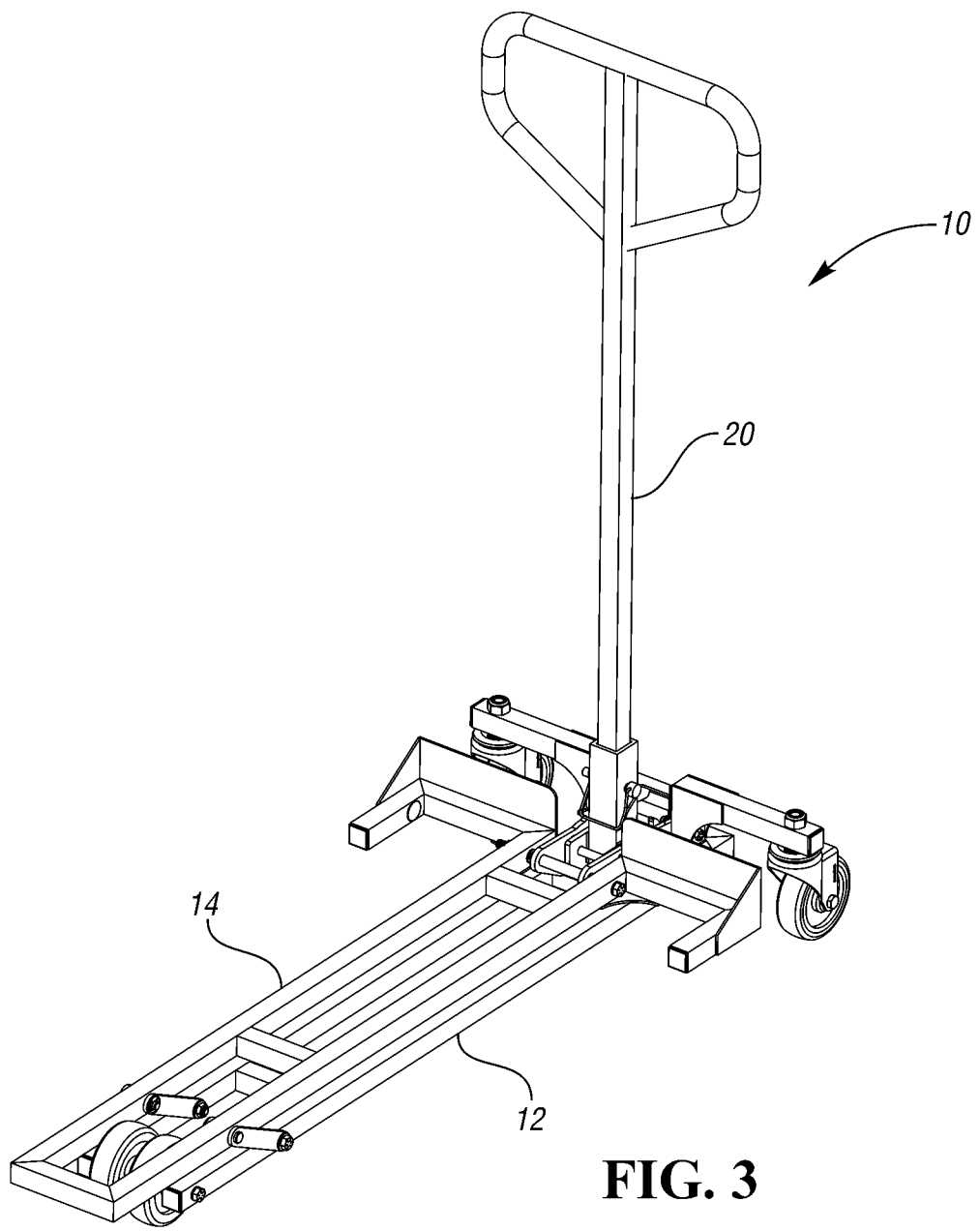
FIG. 3 is a rear perspective view of the sled of FIG. 1.

FIG. 2 is a side view of the sled 10. The upper frame 14 is connected to the lower frame 12 by the pivot arms 16 and the lift mechanism 18. FIG. 3 is a rear perspective view of the sled 10.

Figure 4:
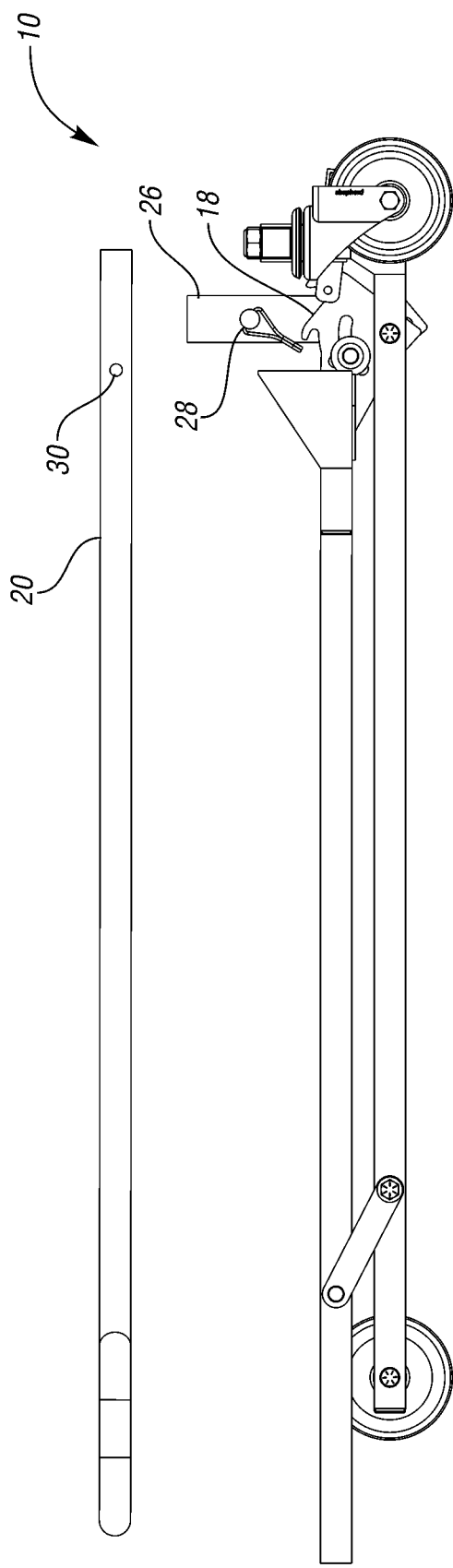
FIG. 4 is a side view of the sled of FIG. 1 with the handle disconnected.

FIG. 4 is a side view of the sled 10 with the handle 20 disconnected. The lift mechanism 18 includes a tubular handle receiver 26 and a pin 28 for connecting the handle 20. The handle 20 includes an aperture 30 for receiving the pin 28 which connects it to the lift mechanism 18.

Figure 5:
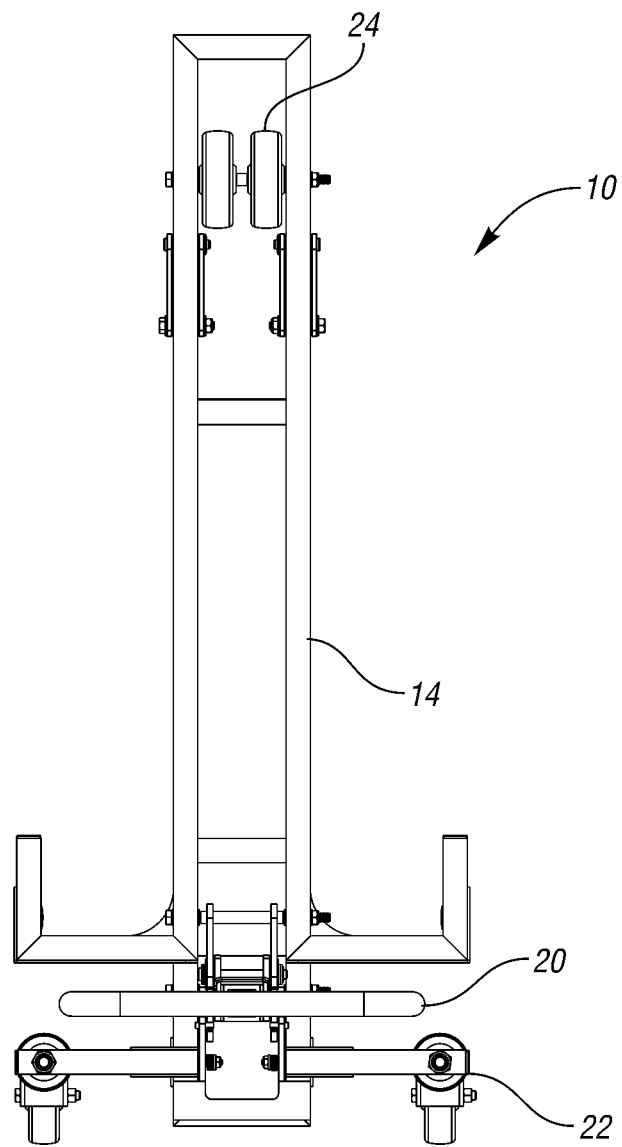
FIG. 5 is a top view of the sled of FIG. 1.

FIG. 5 is a top view of the sled 10. In FIGS. 1-5, the sled 10 is in the lowered position, in which the upper frame 14 is lower and closer to the lower frame 12.

Figure 6:
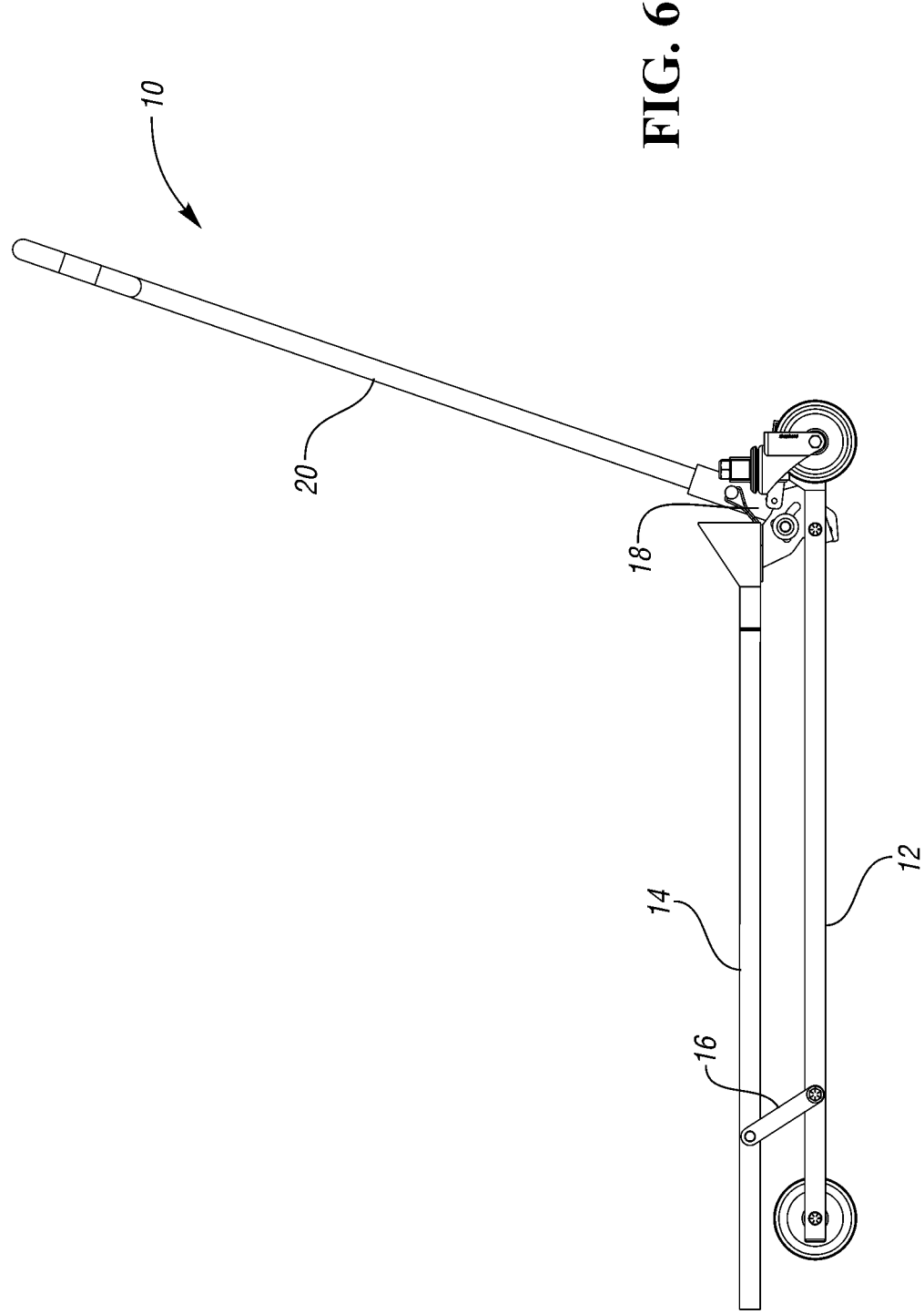
FIG. 6 is a side view of the sled of FIG. 1 in the lifted position.

FIG. 6 is a side view of the sled 10 in the lifted position. Generally, as will be explained in more detail below, the handle 20 can be selectively engaged and pivoted such that moving the handle 20 forward causes the lift mechanism 18 to pivot the upper frame 14 upward and forward relative to the lower frame 12. The pivot arms 16 pivot upward and forward as well.

Figure 7:
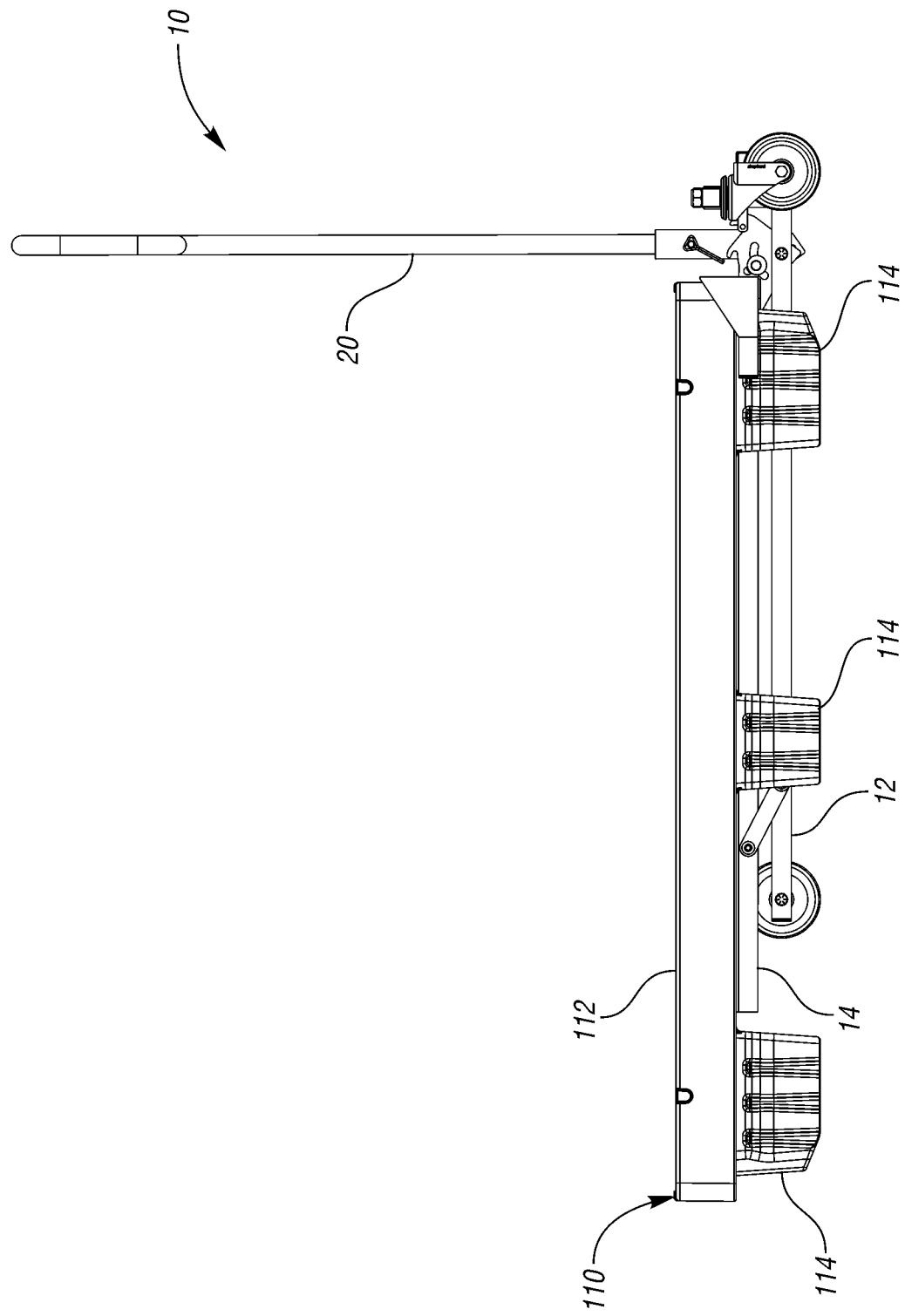
FIG. 7 shows the sled of FIG. 1 in the lowered position with the upper frame and lower frame positioned under a pallet.

FIG. 7 shows the sled 10 in the lowered position with the upper frame 14 and lower frame 12 positioned under a pallet 110. The pallet 110 in this example is a half-pallet with a relatively high aspect ratio. The pallet 110 includes a deck 112 and feet 114 that are nestable in the deck 112 of a similar pallet 110 when empty. As shown, upper frame 14 and lower frame 12 of the sled 10 can be positioned below the deck 112 of the pallet 110 and between the feet 114 (after entering the pallet 110 on the short side).

Figure 8:
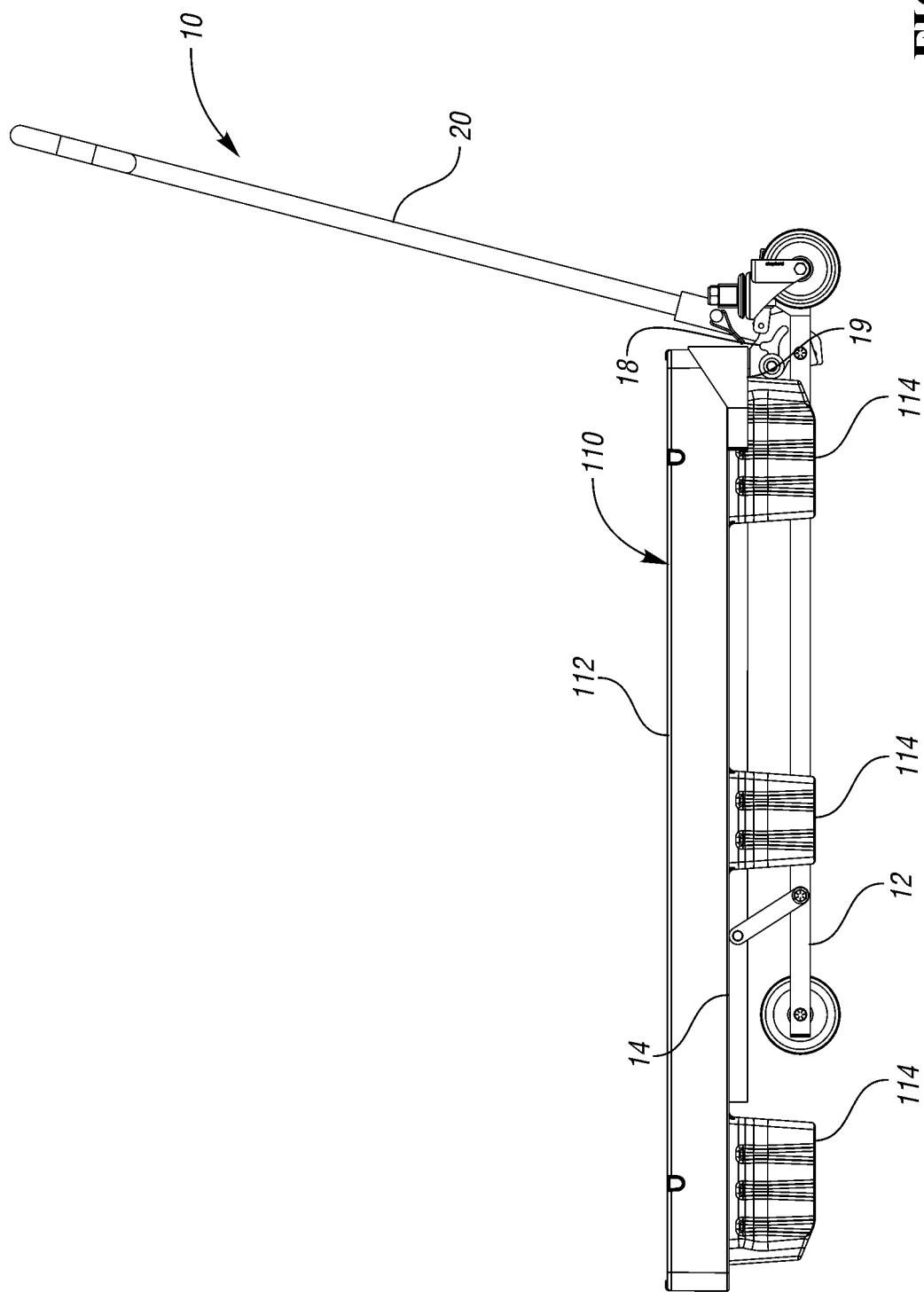
FIG. 8 shows the sled and pallet of FIG. 7 with the handle moved to a second position, which causes the lift mechanism to raise the upper frame and the pallet.
Figure 9:
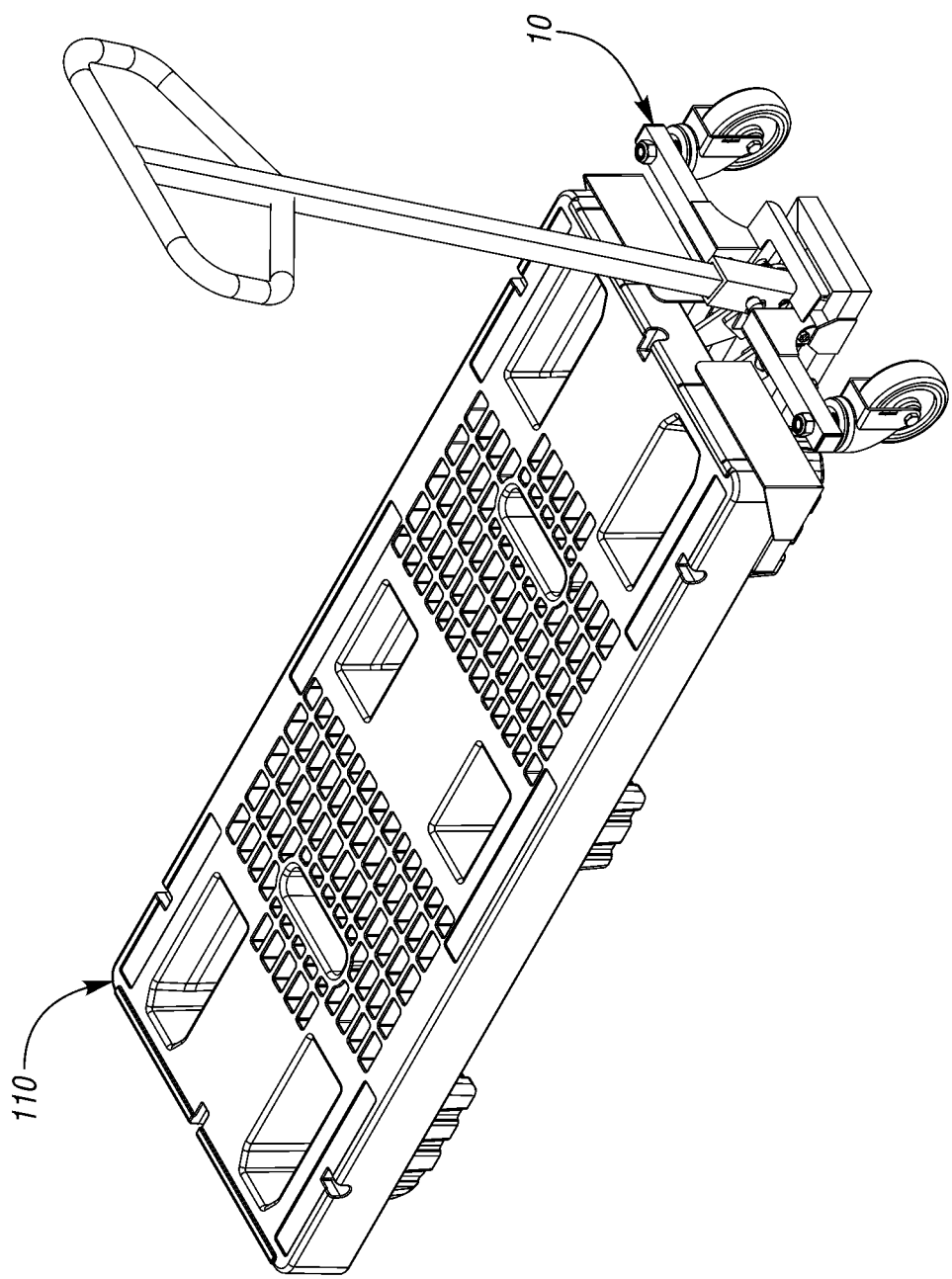
FIG. 9 is a perspective view of the sled and pallet of FIG. 8 in the lifted position.

In FIG. 8, the lift mechanism 18 has raised the upper frame 14, which contacts the underside of the deck 112 to lift the pallet 110 off the floor so that the pallet 110 (and any goods stacked thereon) can be wheeled about by the sled 10. The cradle 19 captures the outer sides of the forward end of the pallet 110 for stability. FIG. 9 is a perspective view of the sled 10 and pallet 110 in the lifted position.

Figure 10:
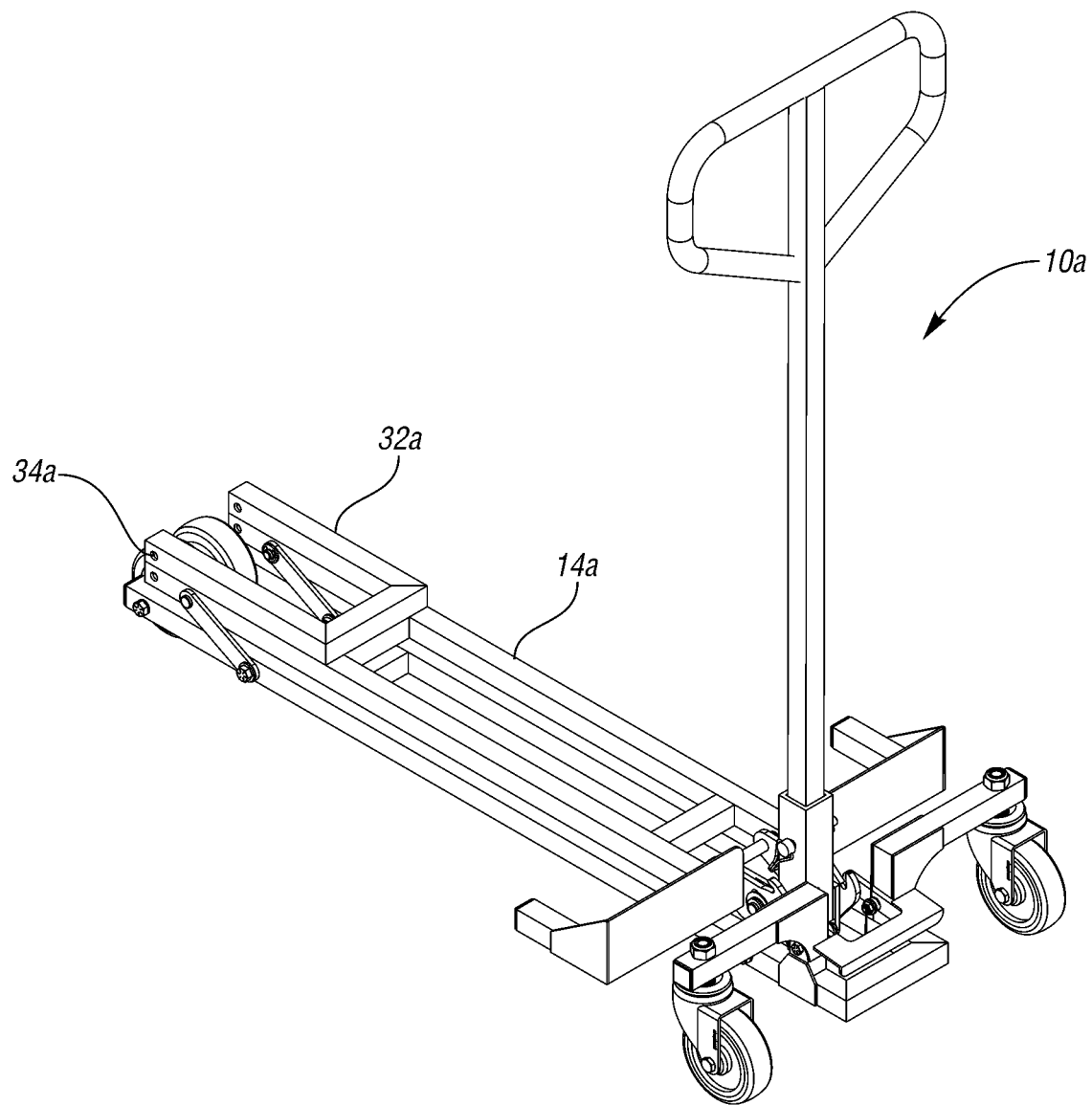
FIG. 10 is a front perspective view of an alternative sled with an alternative frame in a retracted position.

FIG. 10 shows an alternative sled 10a with an alternative upper frame 14a (the rest of the sled 10a is the same as sled 10 of FIGS. 1-9). The upper frame 14a includes a retractable rear portion 32a pivotably connected to the rear end of the rest of the upper frame 14a by a hinge 34a. When empty, the rear portion 32a can be pivoted to the retracted position on the rest of the upper frame 14a, as shown in FIG. 10. This reduces the overall length of the sled 10a for improved maneuverability and easier storage when retracted and empty but provides a longer upper frame 14a when deployed for improved stability when supporting a pallet.

Figure 11:
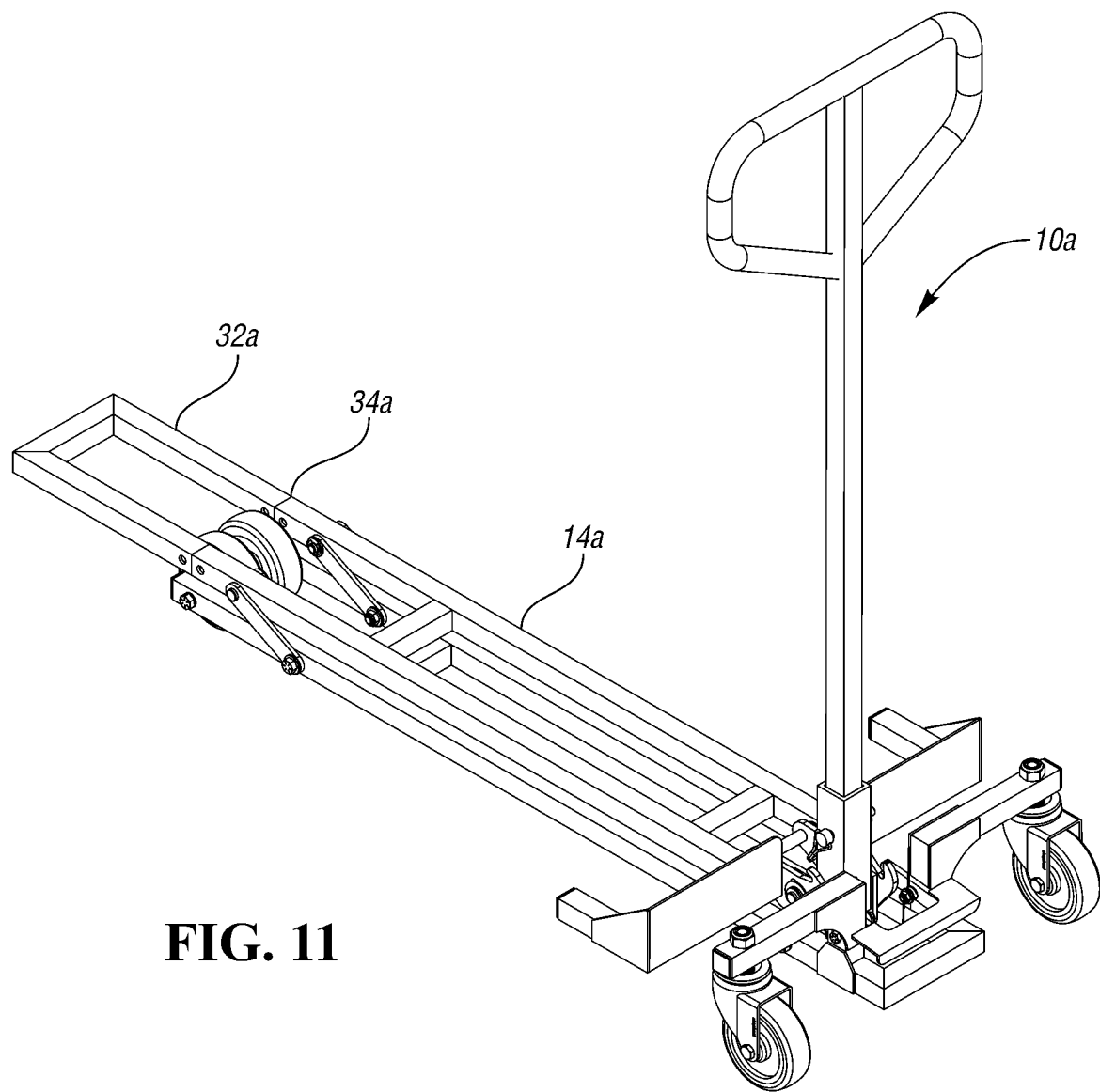
FIG. 11 shows the sled of FIG. 10 with the frame expanded.

As shown in FIG. 11, for use, the rear portion 32a of the upper frame 14a is pivoted rearward such that the rear portion 32a extends rearward of the rest of the upper frame 14a. The sled 10a can be used to support longer pallets and/or to provide a shorter storage length.

Figure 12:
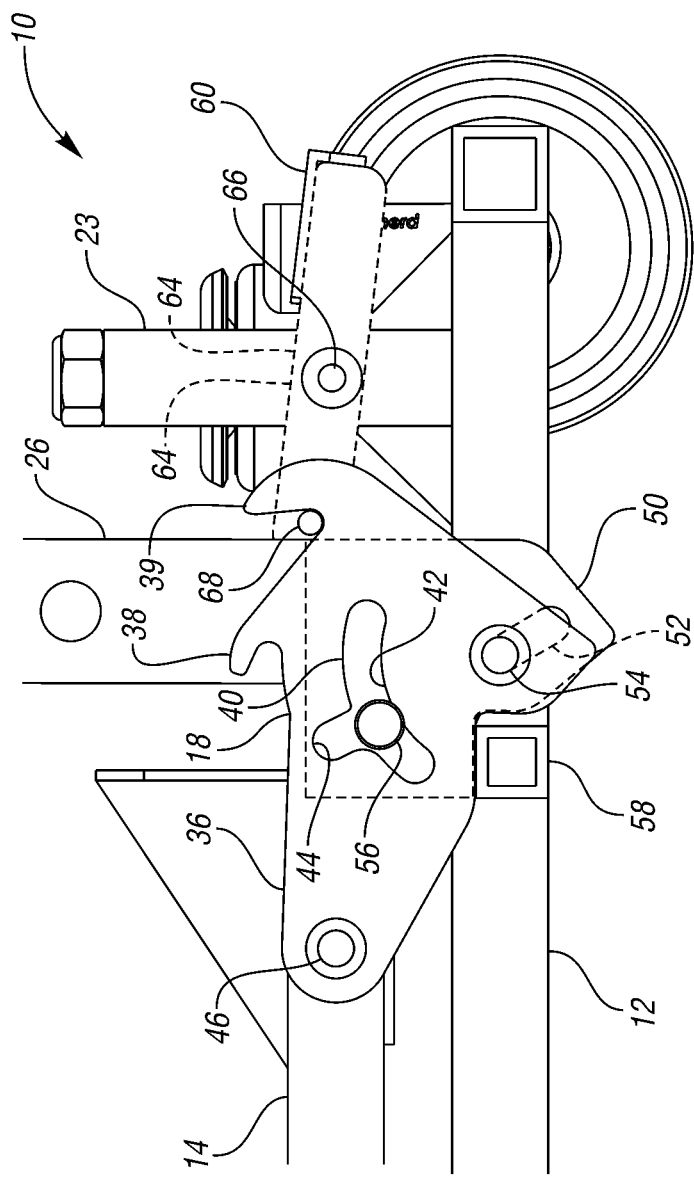
FIG. 12 is a side view of the sled of FIG. 1, partially broken away to show the lift mechanism.
Figure 13:
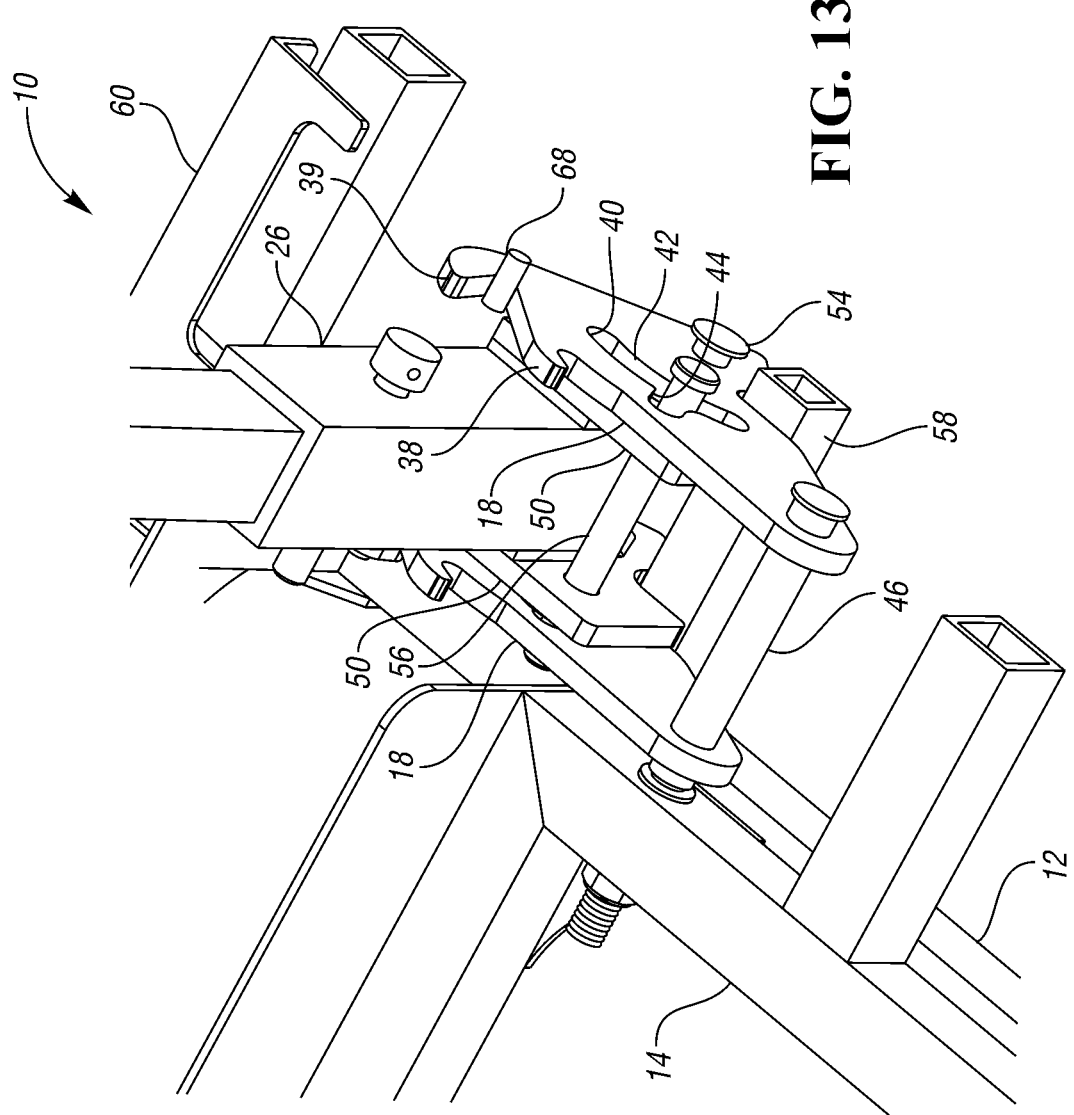
FIG. 13 is a perspective view of the broken-away sled of FIG. 12.

FIG. 12 is a side view of the sled 10 of FIG. 1, partially broken away to expose the lift mechanism 18. FIG. 13 is a perspective view of the broken-away sled 10 of FIG. 12. Note that the lift mechanism 18 is symmetric about the long axis of the sled 10. In FIGS. 12 and 13, the lift mechanism 18 is in the lowered position such that the upper frame 14 is near the lower frame 12. The lift mechanism 18 includes a pair of ratchet plates 36 (one visible) each having a first tooth 38 projecting upward and rearward to define a high notch rearwardly thereof, and a second tooth 39 spaced forward of the first tooth 38 and also projecting upward and rearward to define a low notch rearwardly thereof. The ratchet plate 36 includes a central opening 40 having a lower portion 42 that curves about a lower axis and an upper leg 44 extending radially upward from the lower portion 42. A rearward portion of the ratchet plate 36 is pivotably secured to the upper frame 14 by a pivot pin 46. A lower portion of the ratchet plate 36 is pivotably secured to the lower frame 12 by a lower pivot pin 54. The lower pivot pin 54 also passes through an elongated slot 52 formed in a handle plate 50 positioned adjacent the ratchet plate 36 and fixed to the handle receiver 26. The lower pivot pin 54 is slidable and pivotable in the elongated slot 52 formed in the handle plate 50. An upper pivot pin 56 is fixed to the handle plate 50 and projects outwardly therefrom, the upper pivot pin 56 is slidably and pivotably received in the central opening 40 of the ratchet plate 36.

A lower surface of the ratchet plate 36 between the lower pivot pin 54 and the pivot pin 46 contacts a cross-member 58 of the lower frame 12. This contact provides a limit for rearward rotation of the ratchet plate 36.

A release pedal 60 positioned at forward ends of release arms 64 is pivotably secured by a pivot pin 66 to the arms 23. Rearward ends of the release arms 64 each have a ratchet pin 68 projecting inwardly (i.e. toward one another) therefrom. The ratchet pin 68 engages the teeth 38, 39 on the ratchet plate 36 (this will be explained further below).

Figure 14:
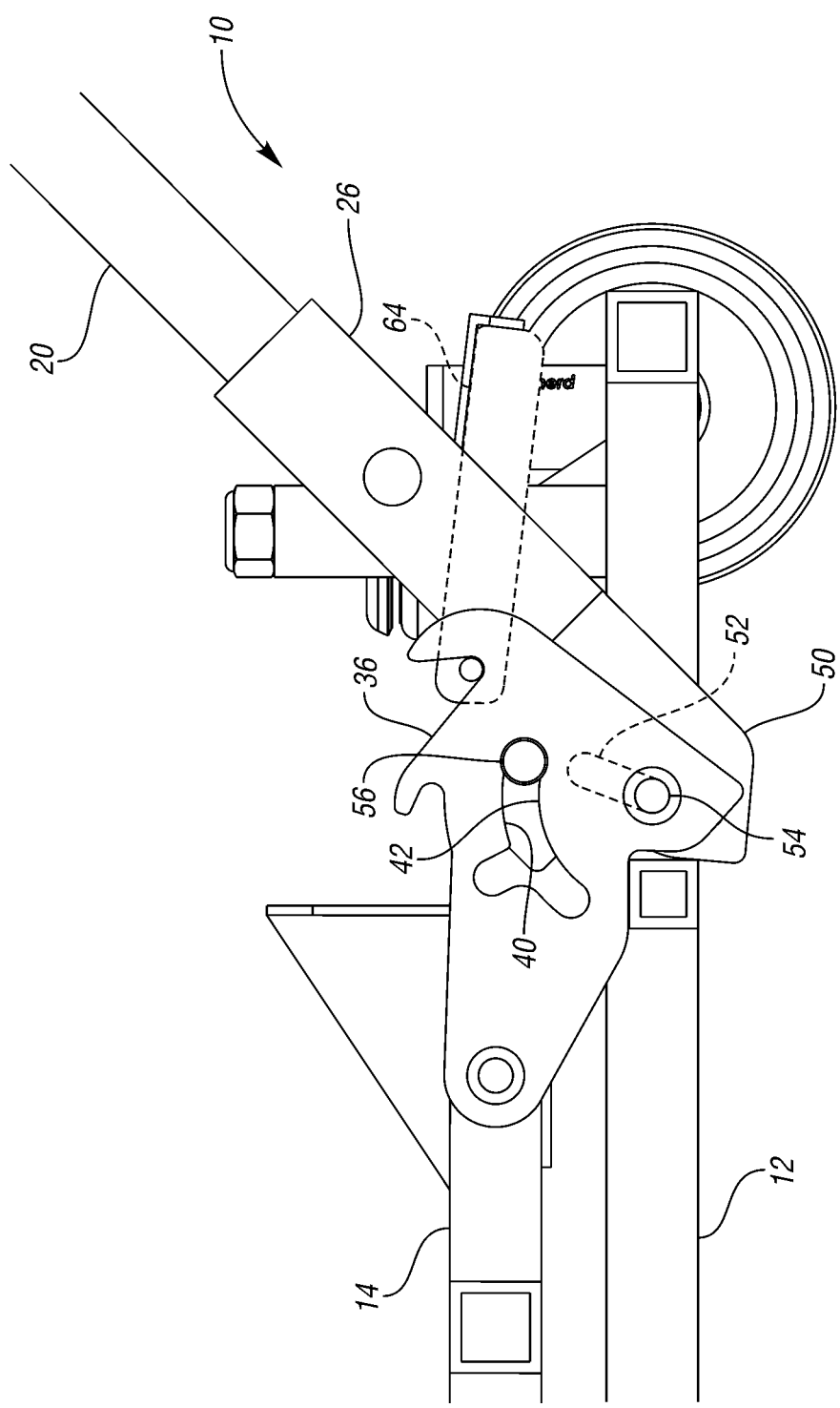
FIG. 14 is similar to FIG. 12, but with the handle pivoted forward to a maneuvering position.

FIG. 14 is a side view of the lift mechanism 18 area of the sled 10 of FIGS. 12 and 13 but with the handle 20 pivoted forward to a maneuvering position. The handle 20 is pivoted forward about the lower pivot pin 54, which pivots in the elongated slot 52 in the handle plate 50. The upper pivot pin 56 slides forward in the lower portion 42 of the central opening 40 of the ratchet plate 36. Note that the handle 20, handle receiver 26 and handle plate 50 can pivot back and forth, moving upper pivot pin 56 within the lower portion 42 of the central opening 40 of the ratchet plate 36 without moving the ratchet plate 36 or raising or lowering the upper frame 14.

Figure 15:
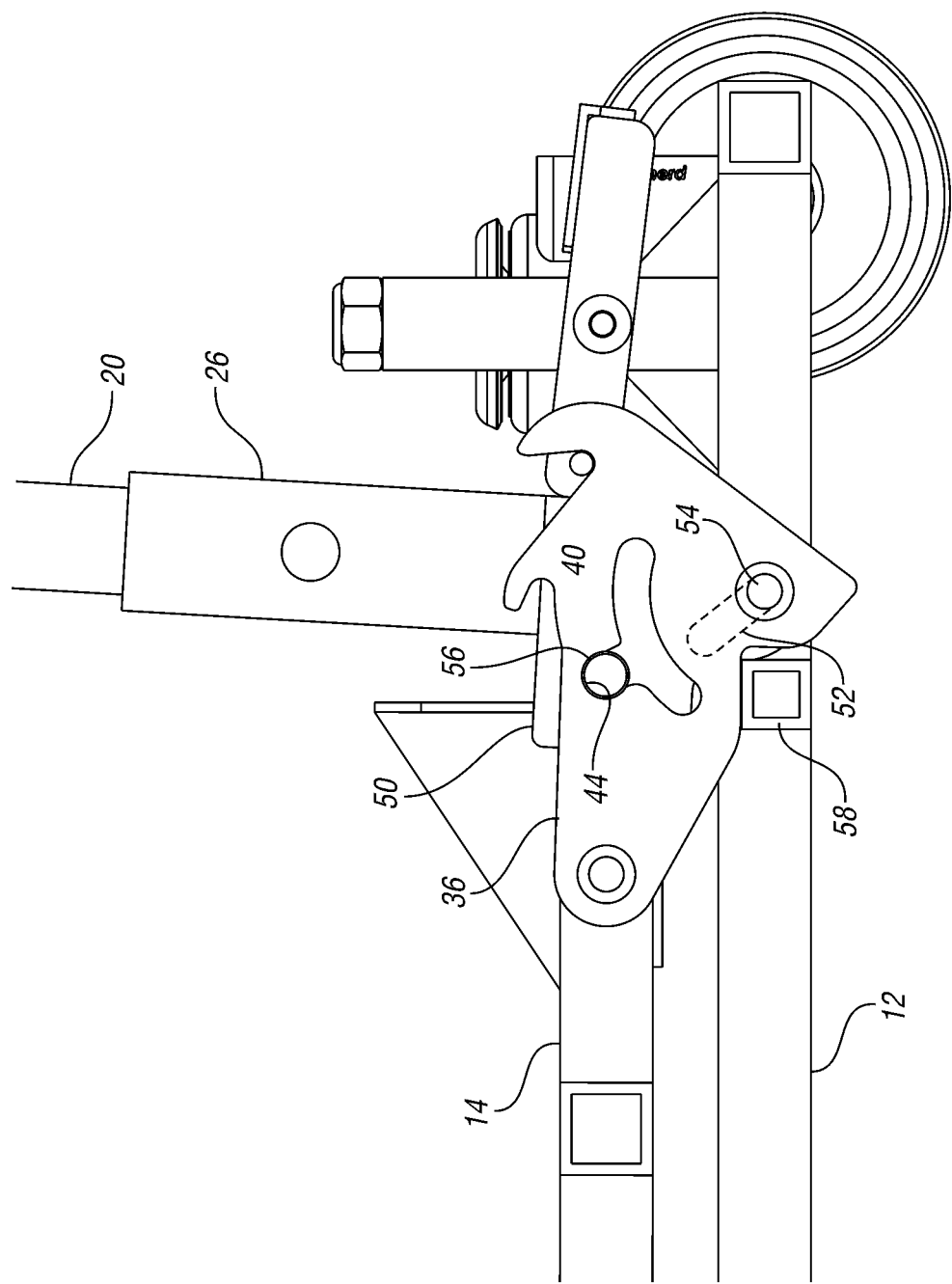
FIG. 15 is similar to FIG. 12, but with the handle moved to an engaged position.

In FIG. 15, the handle 20, handle receiver 26 and handle plate 50 have been pivoted rearward and slid upward such that the upper pivot pin 56 is received in the upper leg 44 of the central opening 40. In this handle-engaged position, movement of the handle 20 forward or rearward will engage the ratchet plate 36 and permit the handle 20 to cause the ratchet plate 36 to pivot on lower pivot pin 54. In FIG. 15, the ratchet plate 36 contacts the cross-member 58, so the ratchet plate 36 can only rotate forward (i.e. clockwise in FIG. 15).

Figure 16:
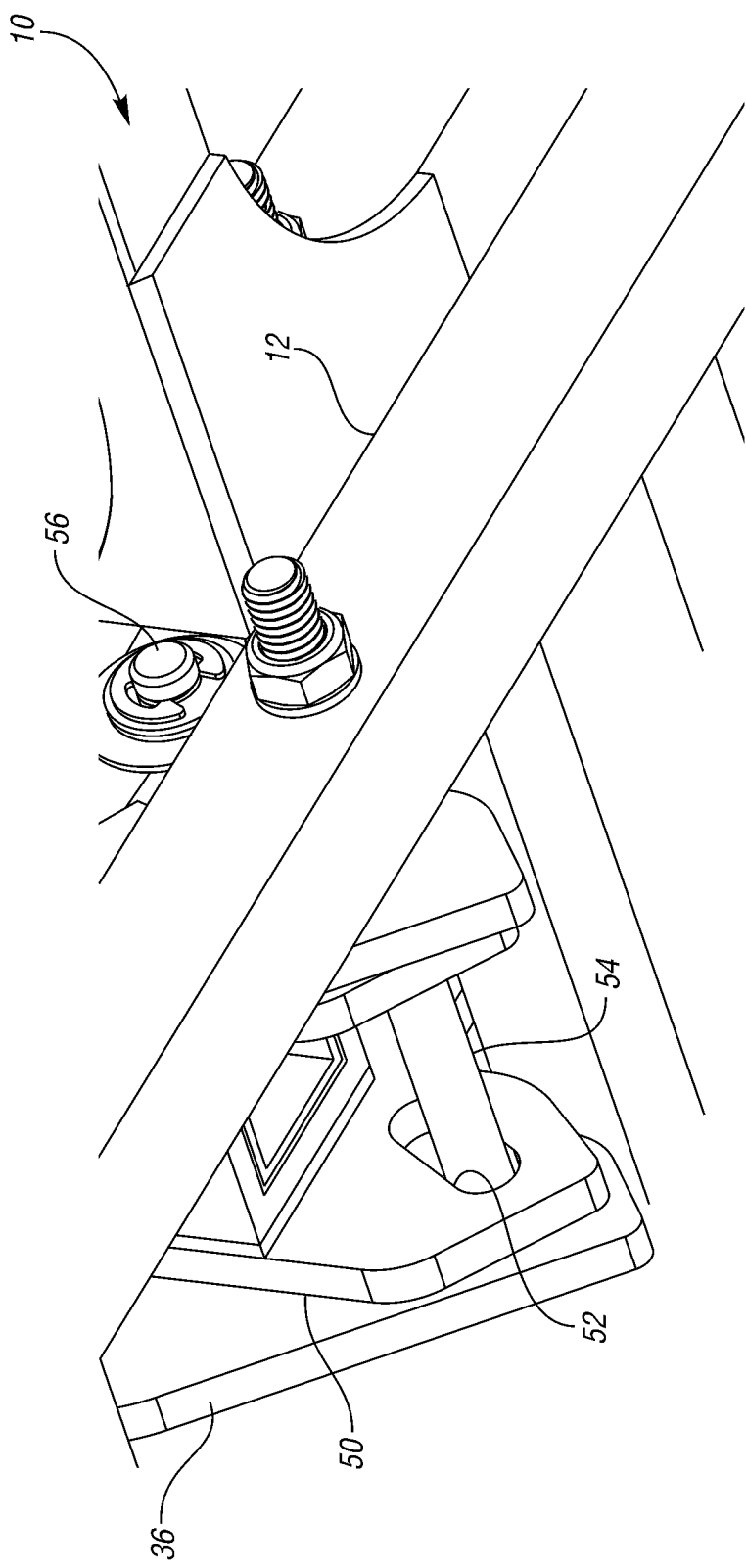
FIG. 16 is a bottom perspective view of the portion of the sled of FIG. 15.

FIG. 16 is a bottom perspective view of the portion of the sled 10 of FIG. 15. The handle plate 50 has been slid upward such that the lower pivot pin 54 is at the bottom of the elongated slot 52.

Figure 17:
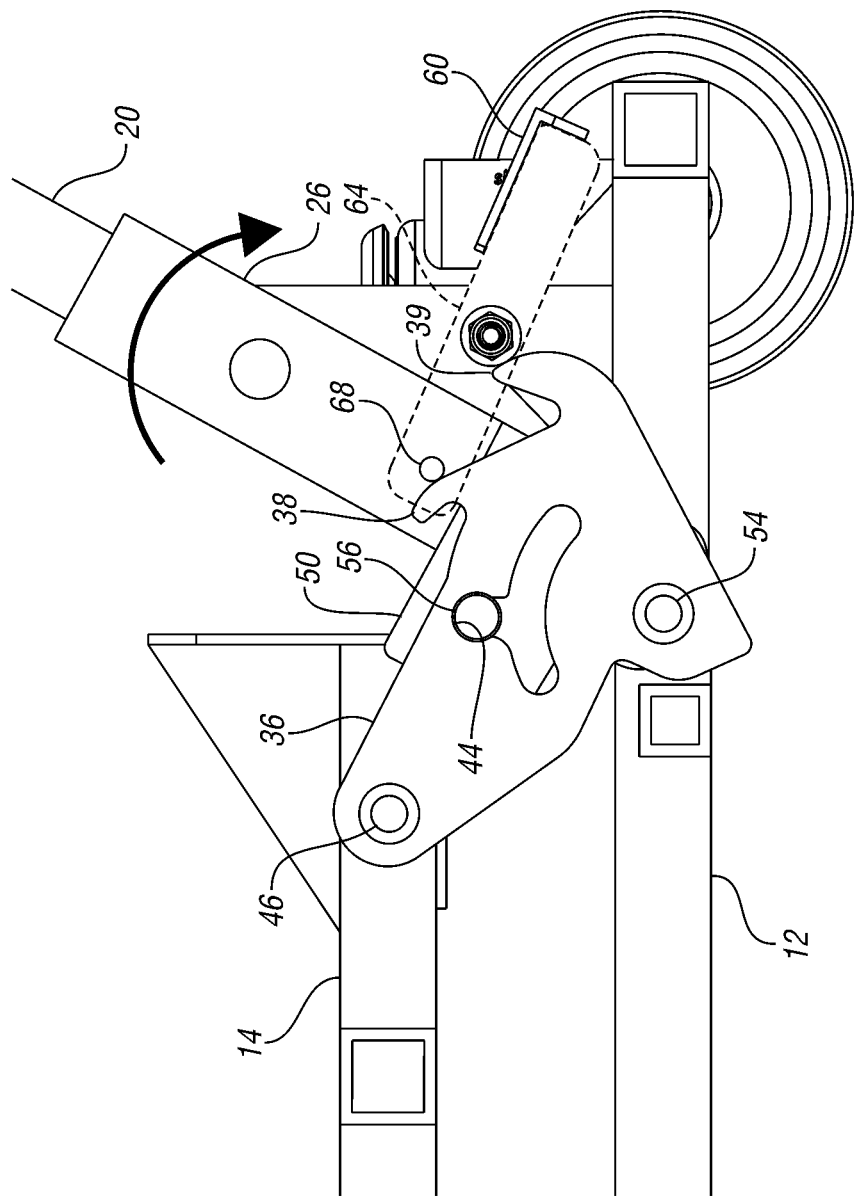
FIG. 17 is similar to FIG. 12, but with the handle and handle receiver being pivoted forward in the handle-engaged position.
Figure 18:
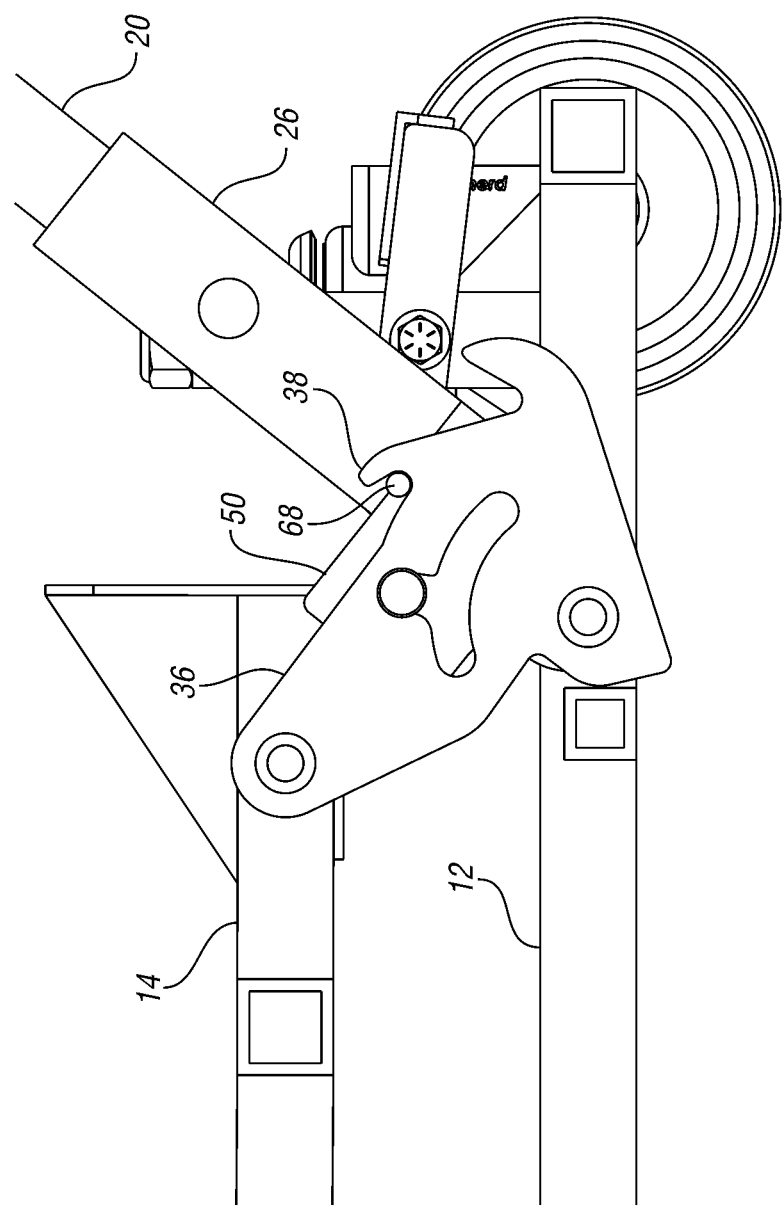
FIG. 18 is similar to FIG. 17, with the lift mechanism locked in the lifted position.

As shown in FIG. 17, the handle 20 and handle receiver 26 can be pivoted forward in the handle-engaged position, thereby pivoting the ratchet plate 36 forward on lower pivot pin 54. This causes the rearward end of the ratchet plate 36 to pivot forward and upward, lifting the upper frame 14 (and any pallet 110 thereon as in FIG. 8) with the pivot pin 46. The ratchet pins 68 slide rearward along the upper surface of the ratchet plate 36 toward the first tooth 38, until the ratchet pins 68 can drop in behind the first tooth 38 into the high notch as shown in FIG. 18. In this position, the lift mechanism 18 is locked in the raised (or lifted) position, with the upper frame 14 spaced further away from the lower frame 12. This corresponds to the lifted position of the pallet 110 in FIG. 8.

Figure 19:
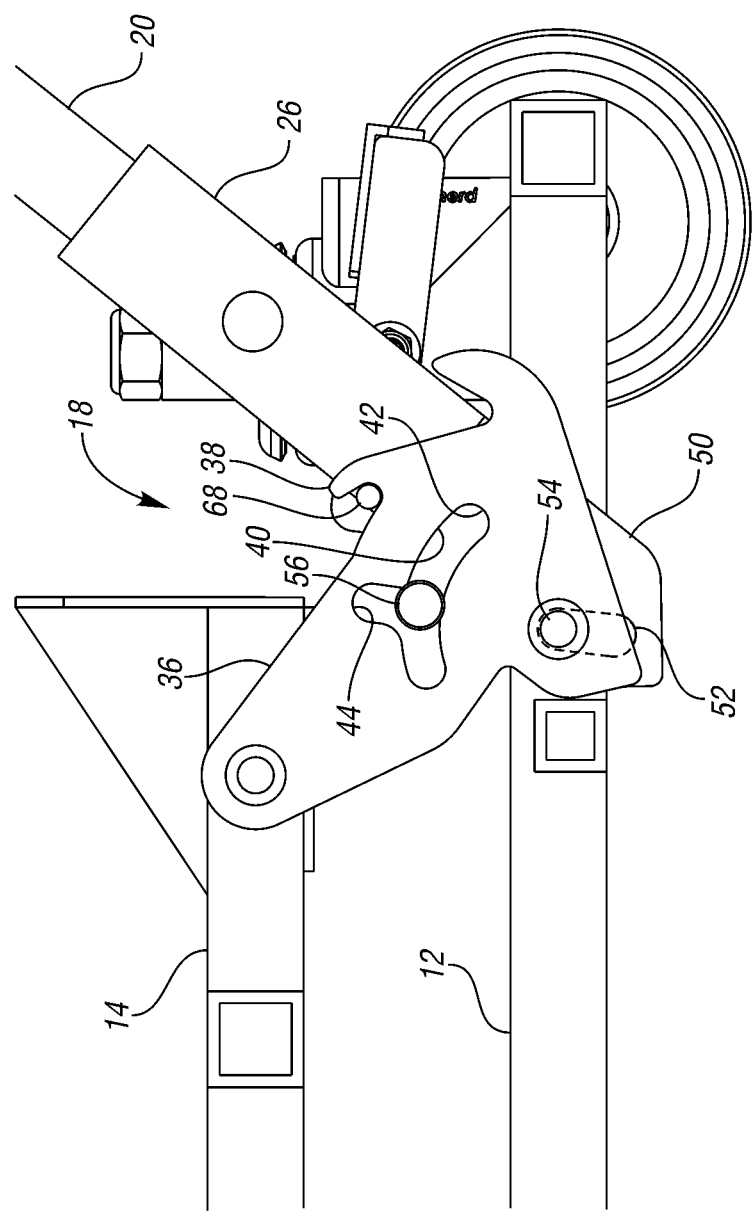
FIG. 19 is similar to FIG. 18, with the handle disengaged.

As shown in FIG. 19, the handle 20, handle receiver 26 and handle plate 50 can then be slid downward relative to the ratchet plate 36, such that the upper pivot pin 56 moves out of the upper leg 44 and into the lower portion 42 of the central opening 40 of the ratchet plate 36. Concurrently, handle plate 50 slides downward on the lower pivot pin 54, such that the lower pivot pin 54 is upward in the elongated slot 52 of the handle plate 50. Note that in this handle-disengaged position, the handle 20, handle receiver 26 and handle plate 50 can again move freely back and forth (i.e. upper pivot pin 56 moves back and forth within the lower portion 42 of the central opening 40) without affecting the position of the upper frame 14.

Figure 20:
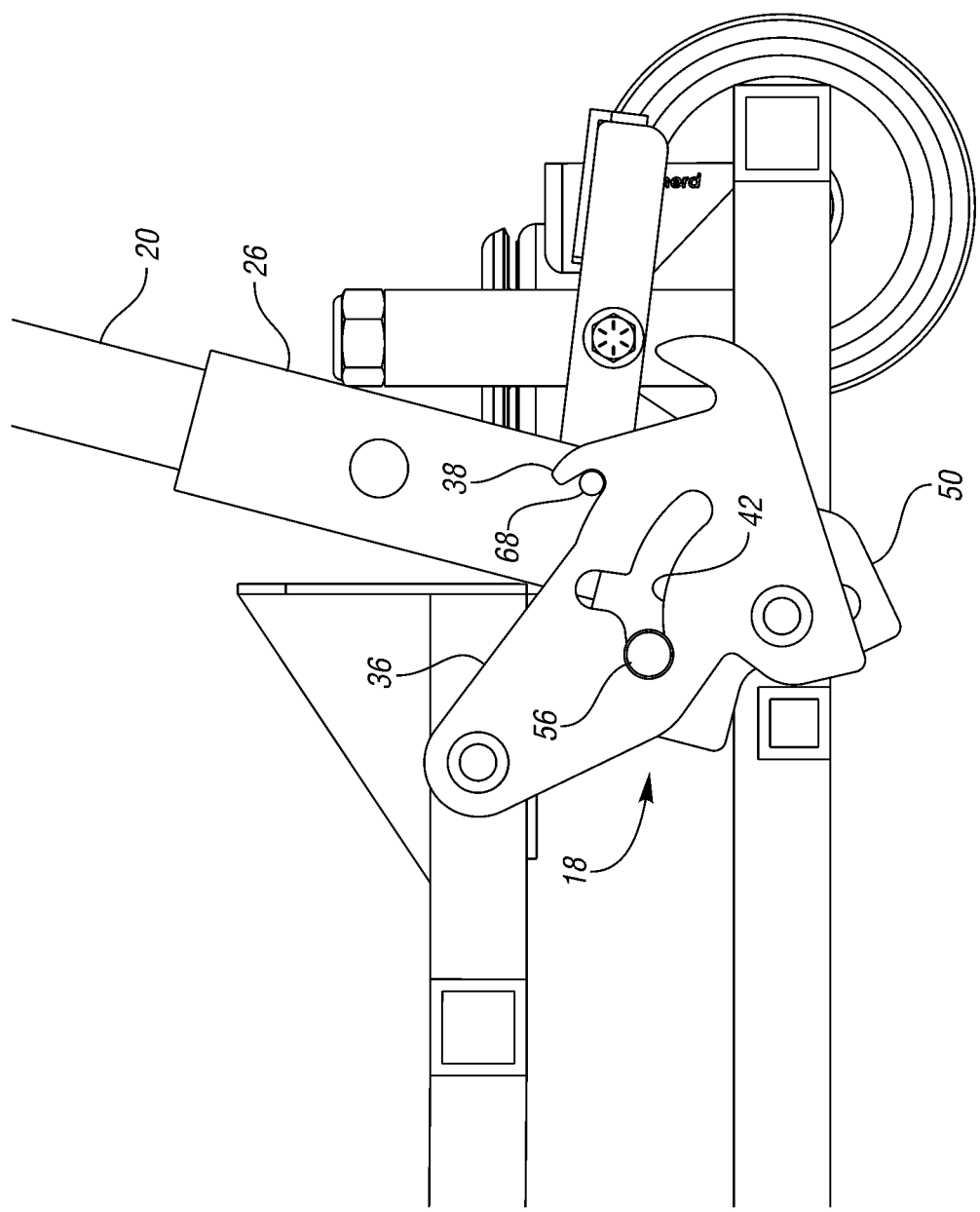
FIG. 20 is similar to FIG. 19, showing the handle pivoted rearward into rearward engagement of the ratchet plate.

As shown in FIG. 20, the handle 20 and handle receiver 26 can be pivoted rearward until upper pivot pin 56 engages the end of the lower portion 42 of the central opening 40 of the ratchet plate 36.

Figure 21:
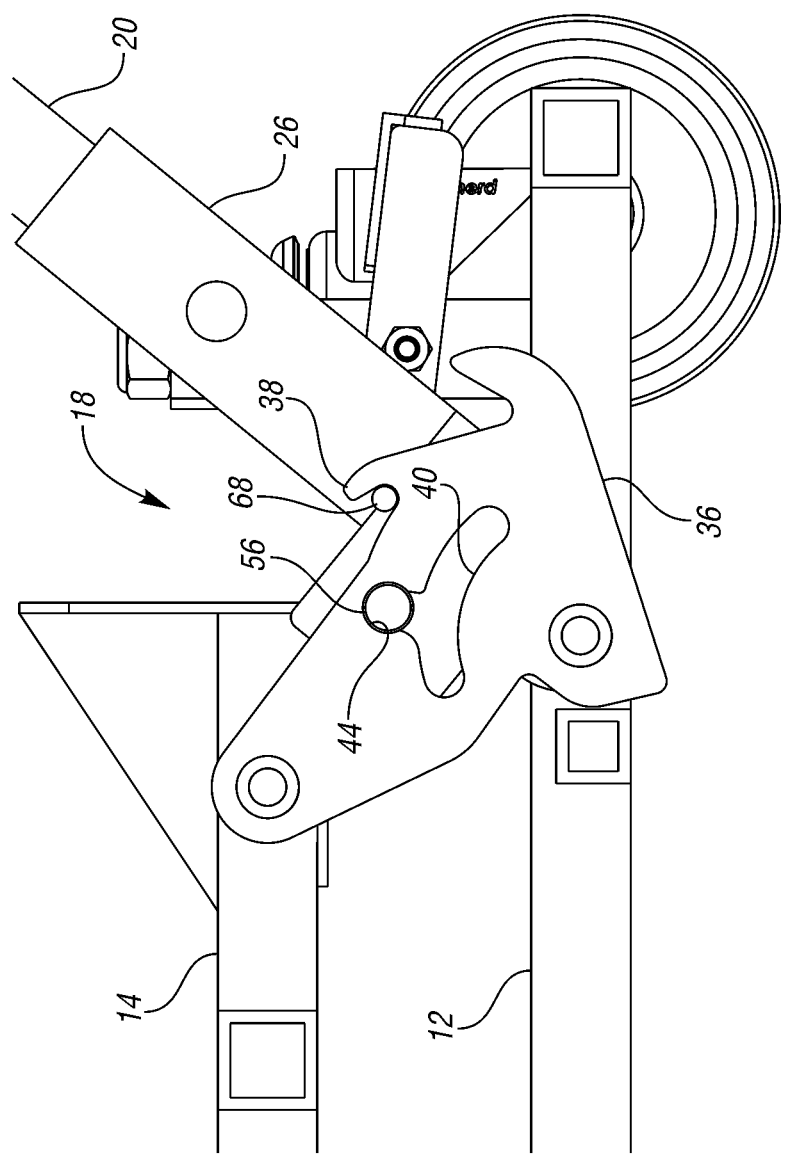
FIG. 21 is similar to FIG. 20 with the handle returned to the engaged position.

Referring to FIG. 21, the handle 20, handle receiver 26 and handle plate 50 can be lifted upward such that the upper pivot pin 56 enters the upper leg 44 of the central opening 40 of the ratchet plate 36. The lift mechanism 18 is returned to the handle-engaged position.

Figure 22:
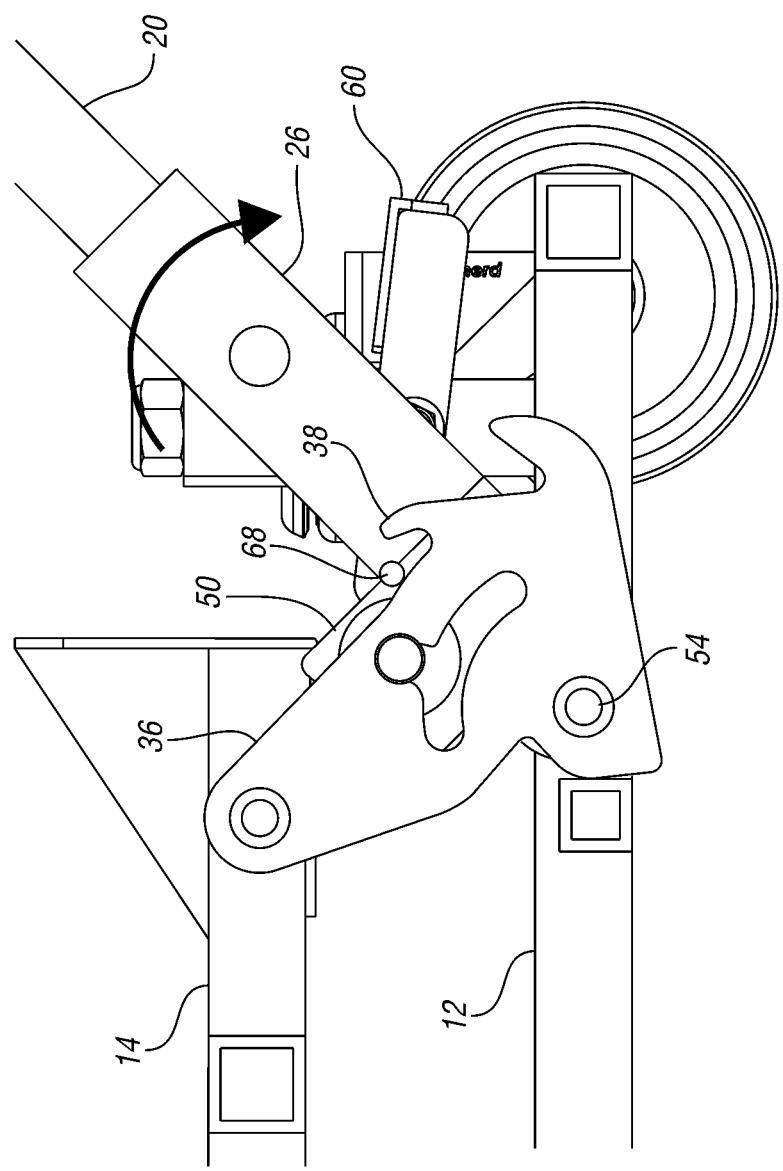
FIG. 22 is similar to FIG. 21 with the handle pivoted forward to release the ratchet pin.
Figure 23:
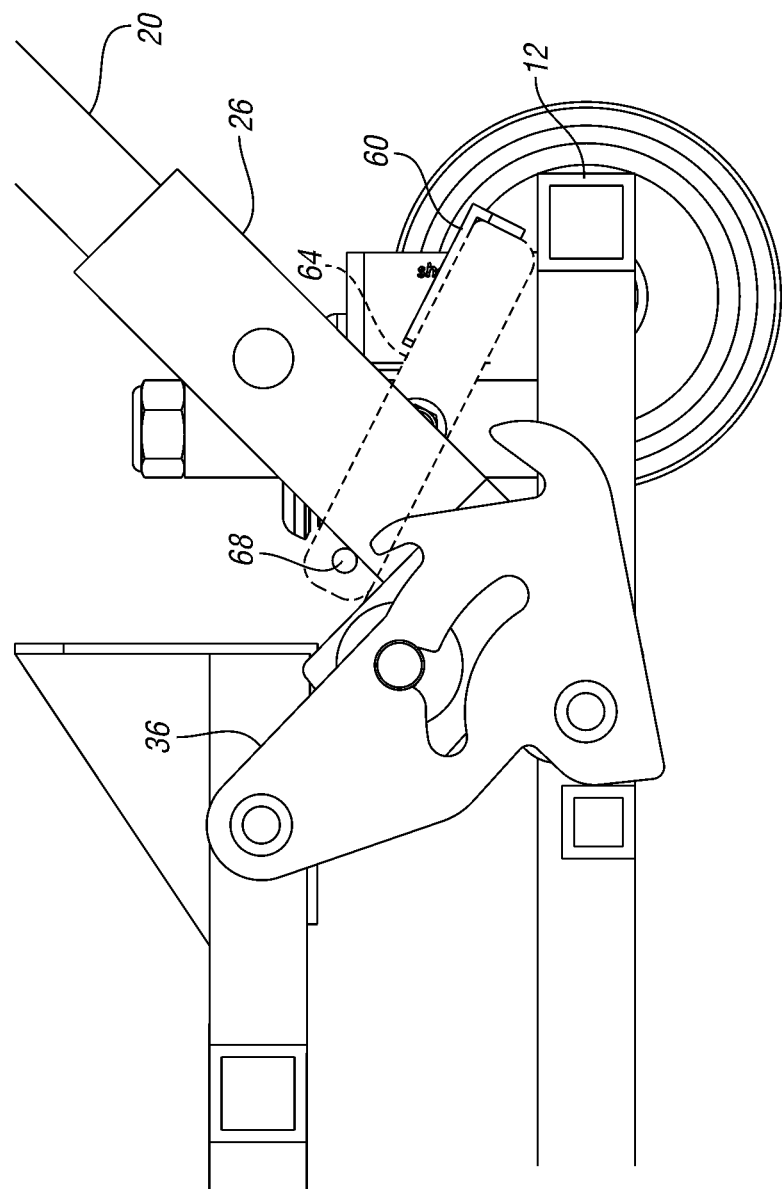
FIG. 23 is similar to FIG. 22 with the release pedal depressed.
Figure 24:
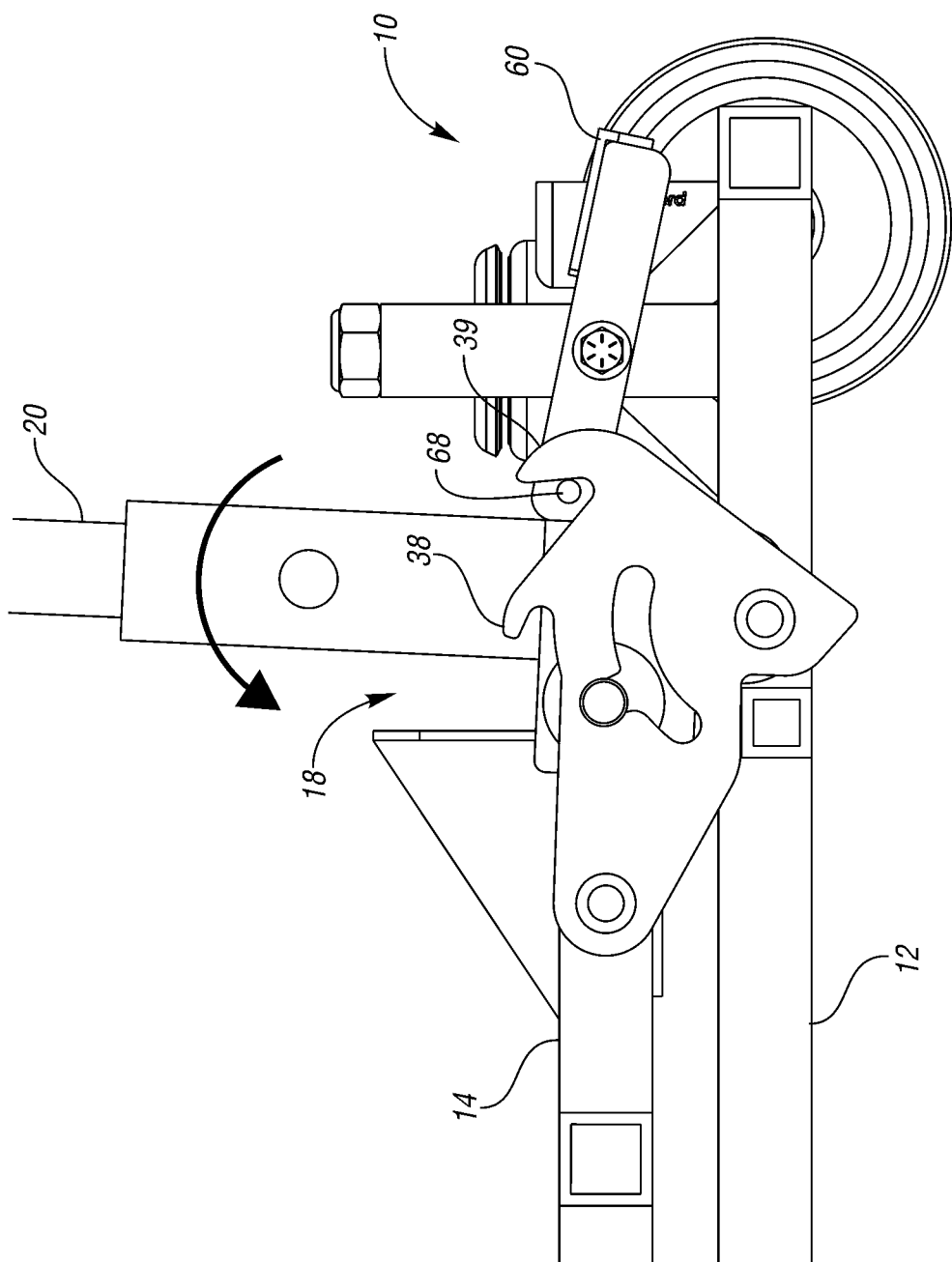
FIG. 24 is similar to FIG. 23 with the handle and ratchet plate pivoted rearward to lower the upper frame.

The handle 20 can then be pivoted forward as shown in FIG. 22, causing ratchet plate 36 to pivot forward until the ratchet pin 68 is clear of the first tooth 38 on the ratchet plate 36. Depressing the release pedal 60, as shown in FIG. 23, then causes the release arm 64 to pivot the ratchet pin 68 upward away from the ratchet plate 36. Moving the handle 20 rearward then permits the ratchet plate 36 to pivot rearward, the first tooth 38 moving past the ratchet pin 68, until the second tooth 39 captures the ratchet pin 68 in the low notch as shown in FIG. 24, and the lift mechanism 18 is returned to the lowered position. In the lowered position, the upper frame 14 is closer to the lower frame 12.

Figure 25:
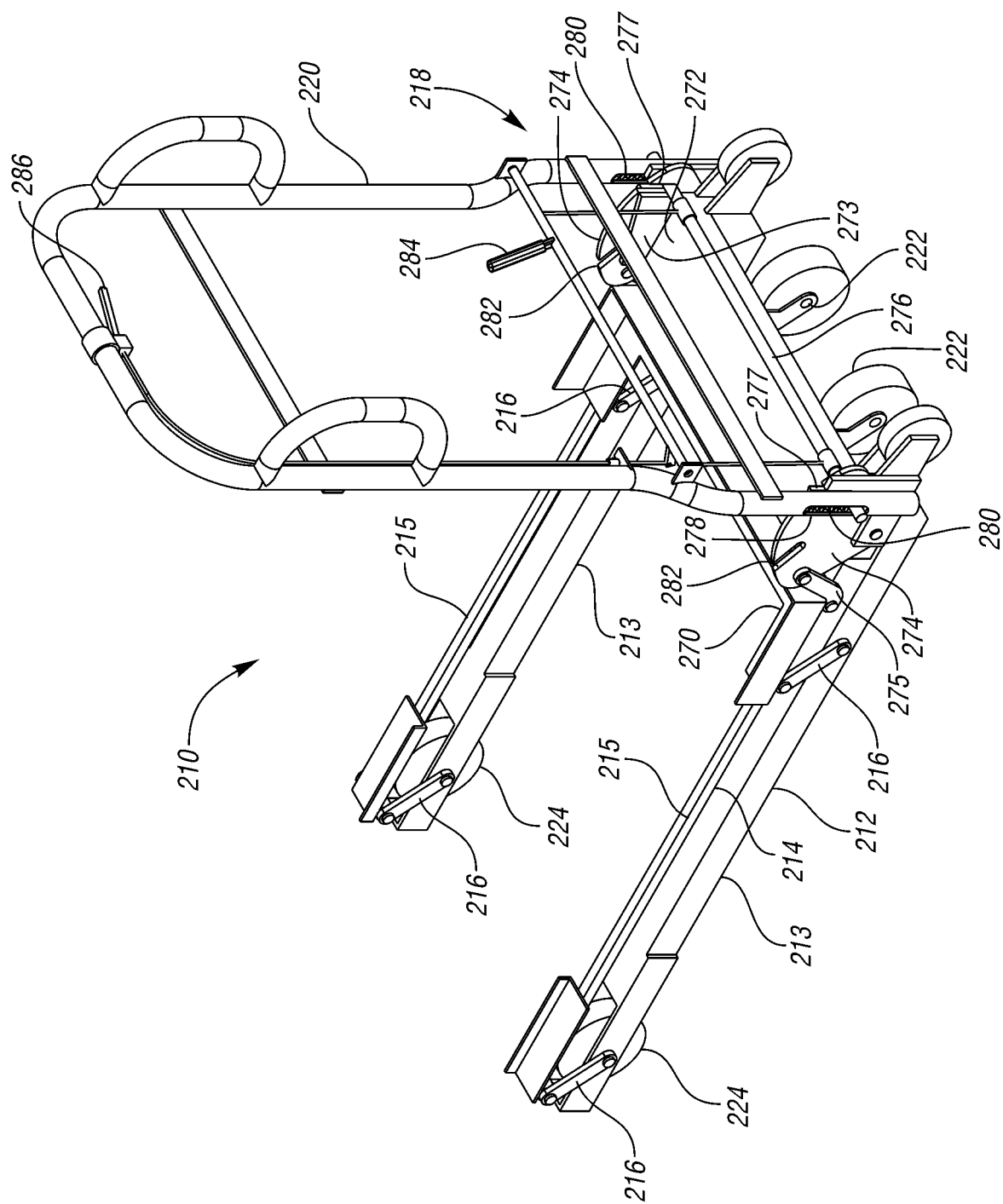
FIG. 25 is a front perspective view of a pallet sled according to a second embodiment, with the handle in the upright, engaged position and the upper frame in the lowered position.
Figure 26:
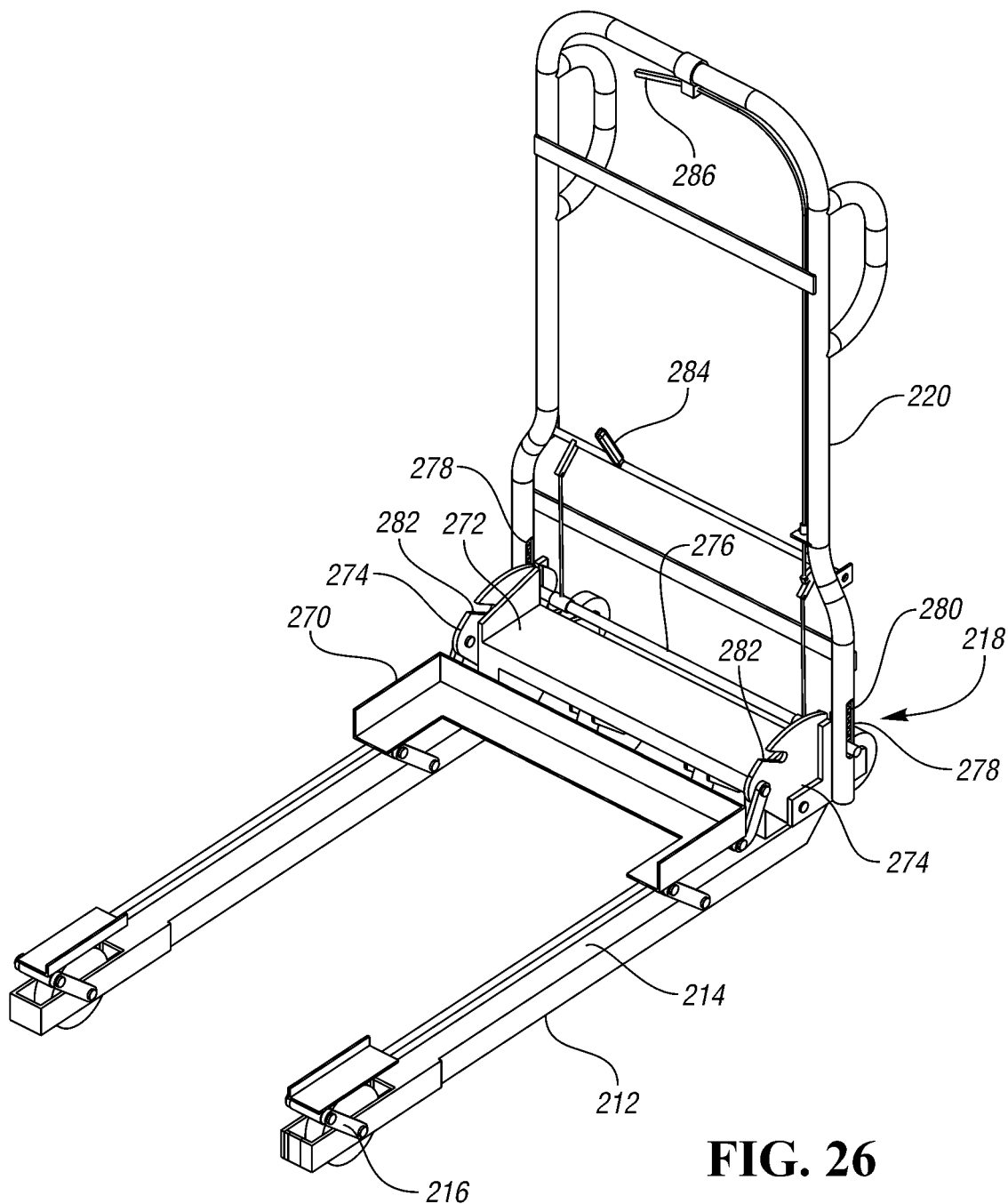
FIG. 26 is a rear perspective view of the pallet sled of FIG. 25.
Figure 27:
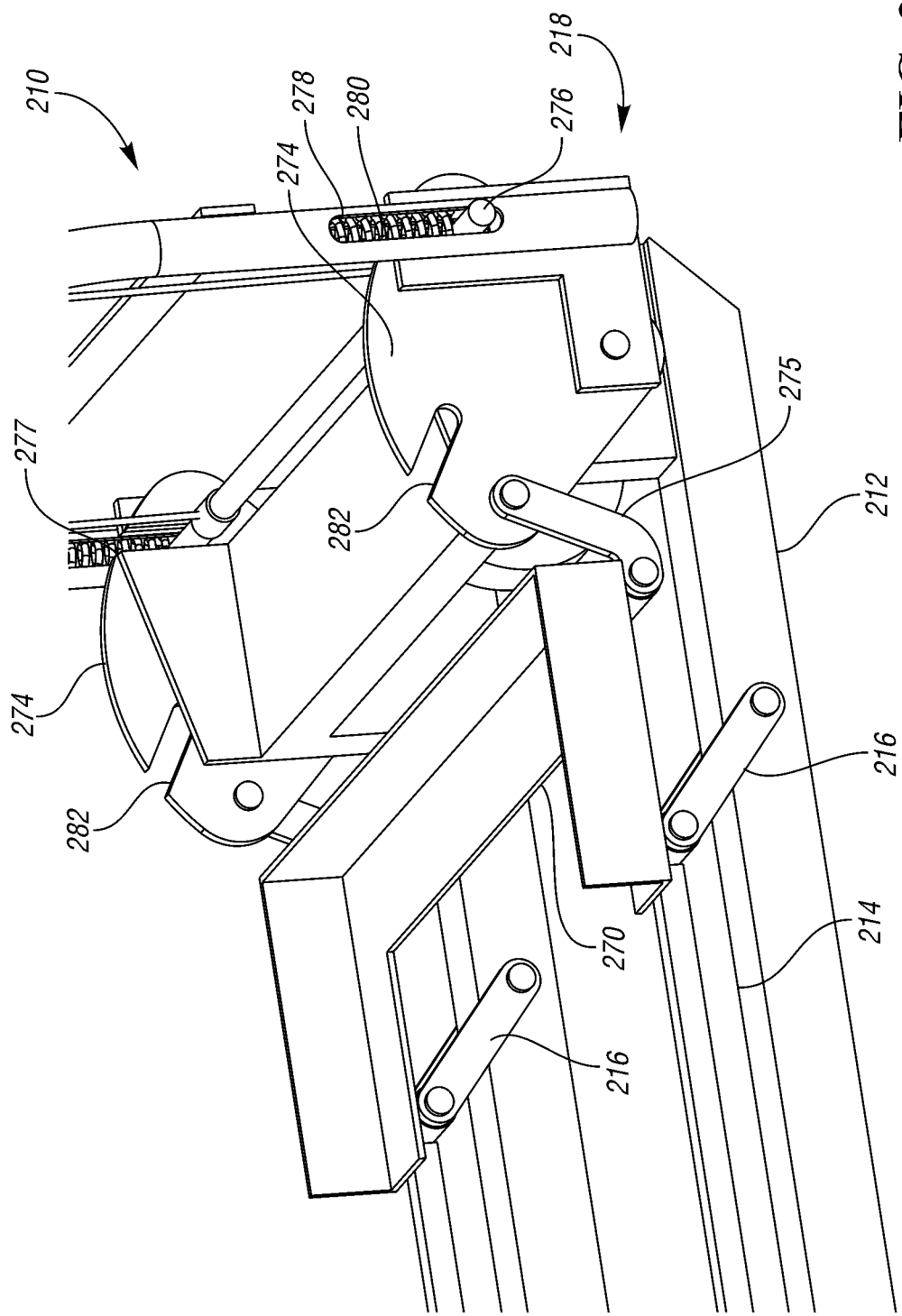
FIG. 27 is an enlarged view of a portion of the lift mechanism of FIG. 26.

FIG. 25 is a front perspective view of a pallet sled 210 according to a second embodiment. FIG. 26 is a rear perspective view of the pallet sled 210 and FIG. 27 is an enlarged view of a portion of the lift mechanism 218, of the pallet sled 210 in the same position as in FIG. 25. The sled 210 includes a lower frame 212 and upper frame 214 connected by pivot arms 216 and by a lift mechanism 18. The lower frame 212 includes a pair of lower arms 213 connected by a base 272 at a forward end. A pair of flanges 273 extend upward from side edges of the base 272. The upper frame 214 includes a pair of upper arms 215 connected by U-shaped cradle 270 at a forward end.

A handle 220 connects to the lift mechanism 218 at a forward end of the sled 210. A pair of casters 222 support the lower frame 212 at the forward end. A pair of wheels 224 support the lower frame 212 at the rearward end.

The handle 220 is pivotably connected to the base 270 and the lower frame 212. A pair of ratchet plates 274 are also pivotably connected to the base 270 about the same axis as the handle 220. The ratchet plates 274 are pivotably connected to the upper frame 214 by a pair of angled brackets 275. Each ratchet plate 274 includes a low notch 277 and a high notch 282 (shown more clearly in FIG. 27).

An index crossbar 276 extends between vertical portions of the handle 220 and through elongated openings 280 in each vertical portion. A spring 278 in each vertical portion of the handle 220 biases the index crossbar 276 downward. In the position shown, where the upper frame 214 is lowered, the index crossbar 276 is also received in the low notch 277 in each ratchet plate 274 and retained there by the spring 278. The index crossbar 276 may also bear against the flanges 273 on the base 272 to prevent further rearward movement of the handle 220 and ratchet plates 274.

A pivotable folding lever 284 is mounted to the handle at a first height and a handle lever 286 is mounted at a second height (higher than the first). Either lever 284, 286 can raise the index crossbar 276 upward within the elongated openings 280 in the handle 220, compressing the springs 278.

In FIGS. 25-27, the handle 220 is engaged with the ratchet plates 274, with the index crossbar 276 engaging the low notches 277 of the ratchet plates 274, so that the upper frame 214 is in the lowered position, close to the lower frame 212.

Figure 28:
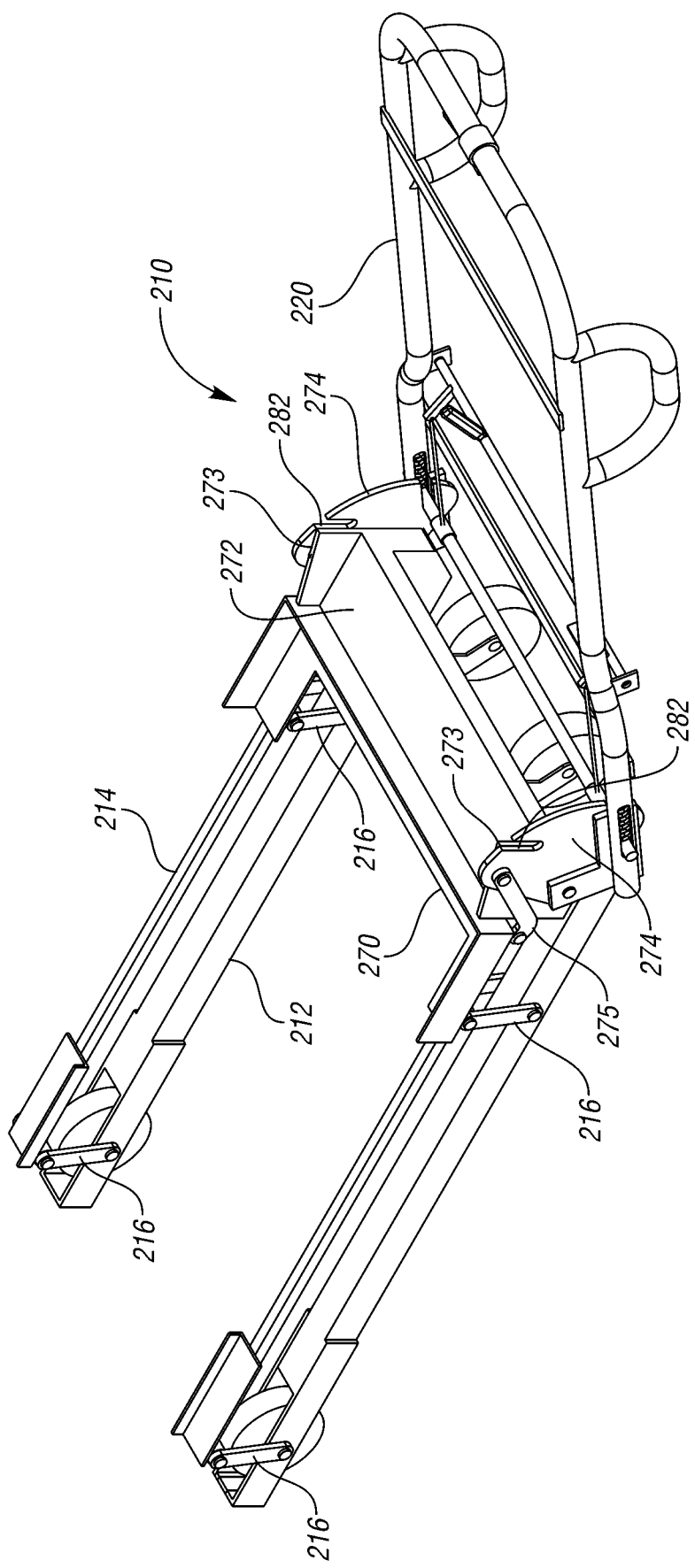
FIG. 28 is a front perspective view of the pallet sled of FIG. 25 with the handle in a forward position that raised the upper frame to a lifted position.
Figure 29:
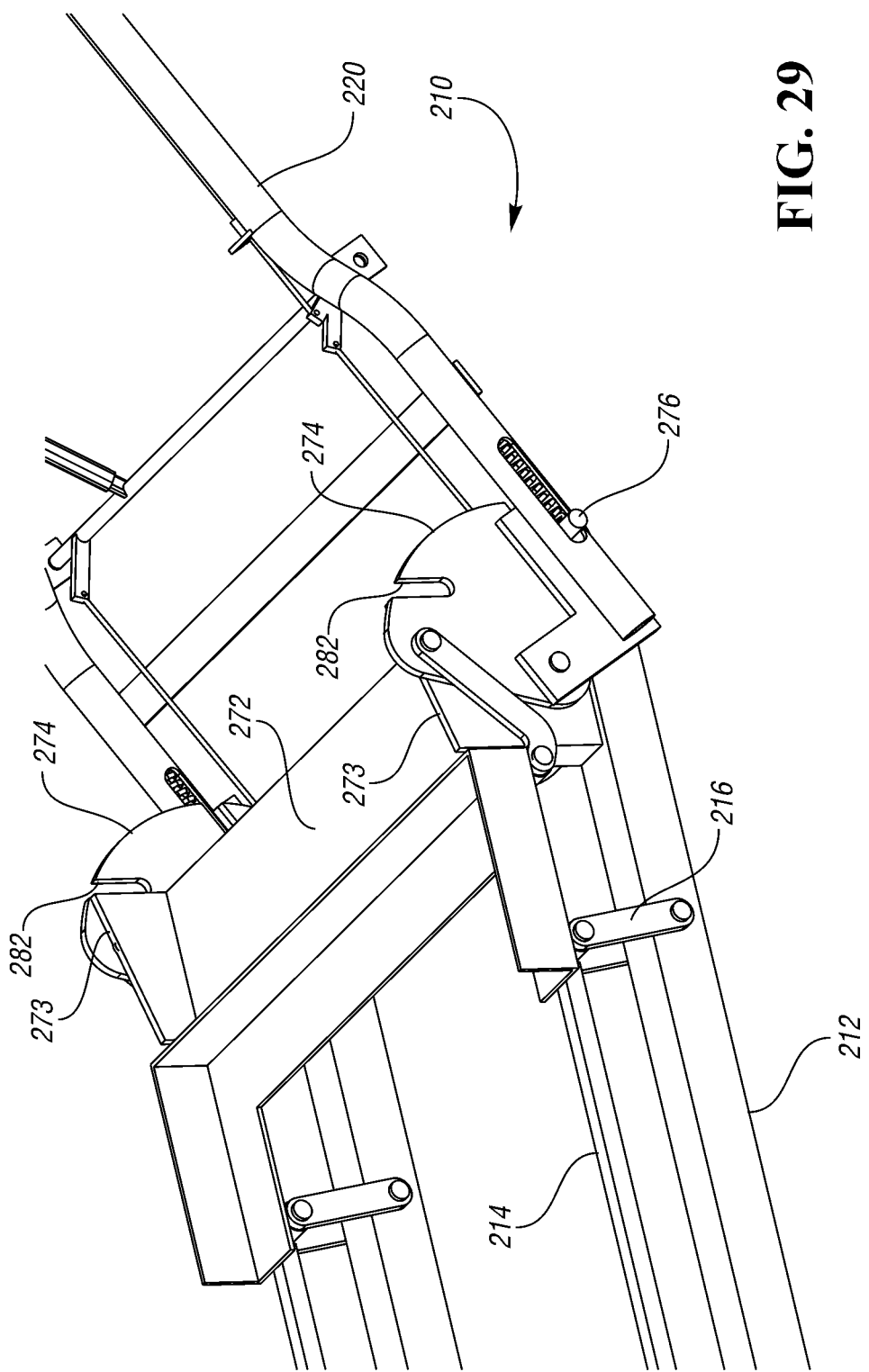
FIG. 29 is an enlarged view of a portion of the lift mechanism of FIG. 28.

To raise the upper frame 214 to the raised position, the handle 220 can be pulled forward and down as shown in FIGS. 28 and 29. This causes the ratchet plates 274 to pivot forward, drawing the upper frame 214 forward and upward (pivoting on arms 216). The upper frame 214 pivots forward to a point where the arms 216 are past vertical, so that the upper frame 214 will remain in place even after force on the handle 220 is no longer applied.

Figure 30:
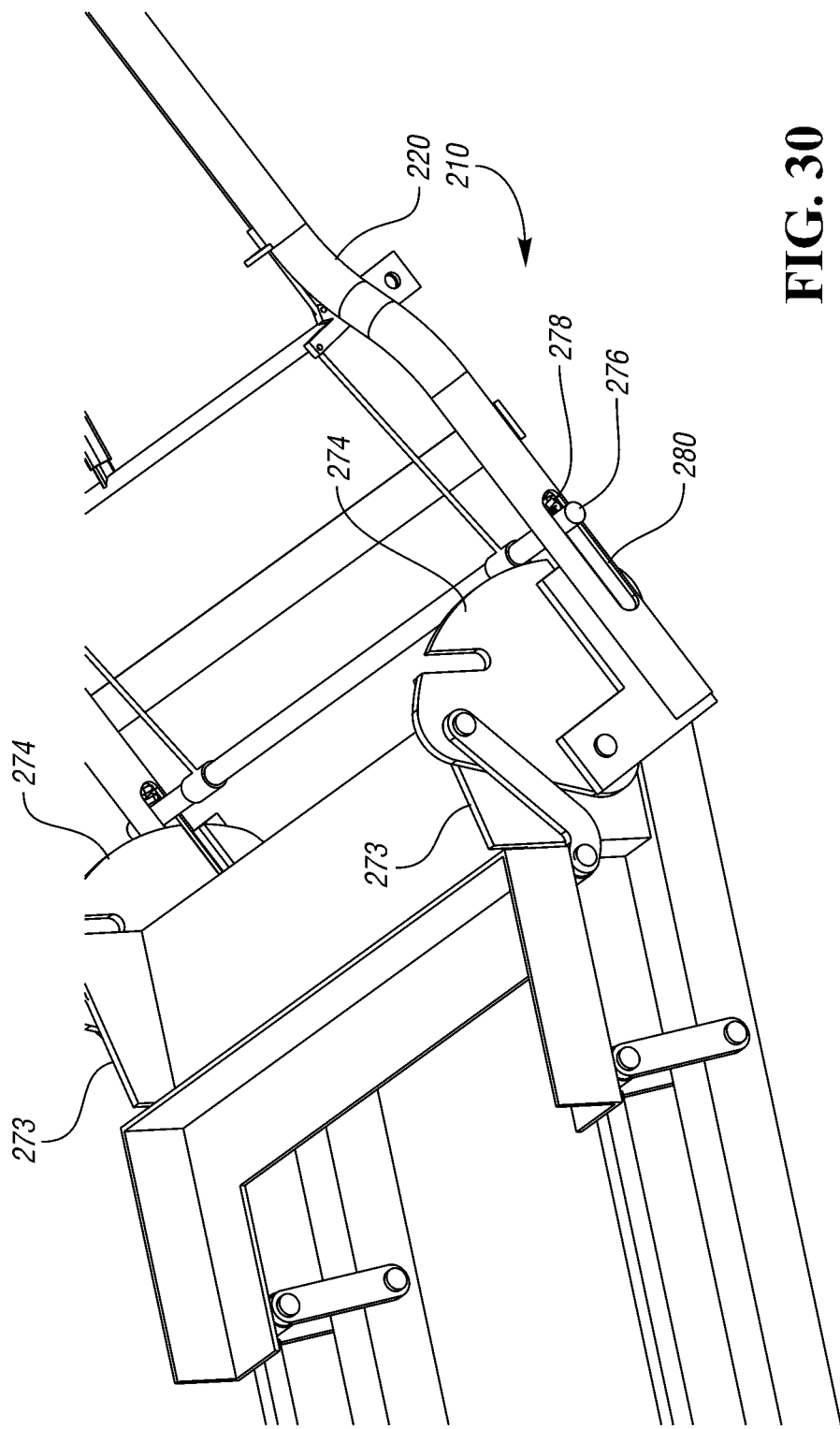
FIG. 30 is a view similar to that of FIG. 29 with the handle disengaged and pivoted forward, and the upper frame in the lifted position.
Figure 31:
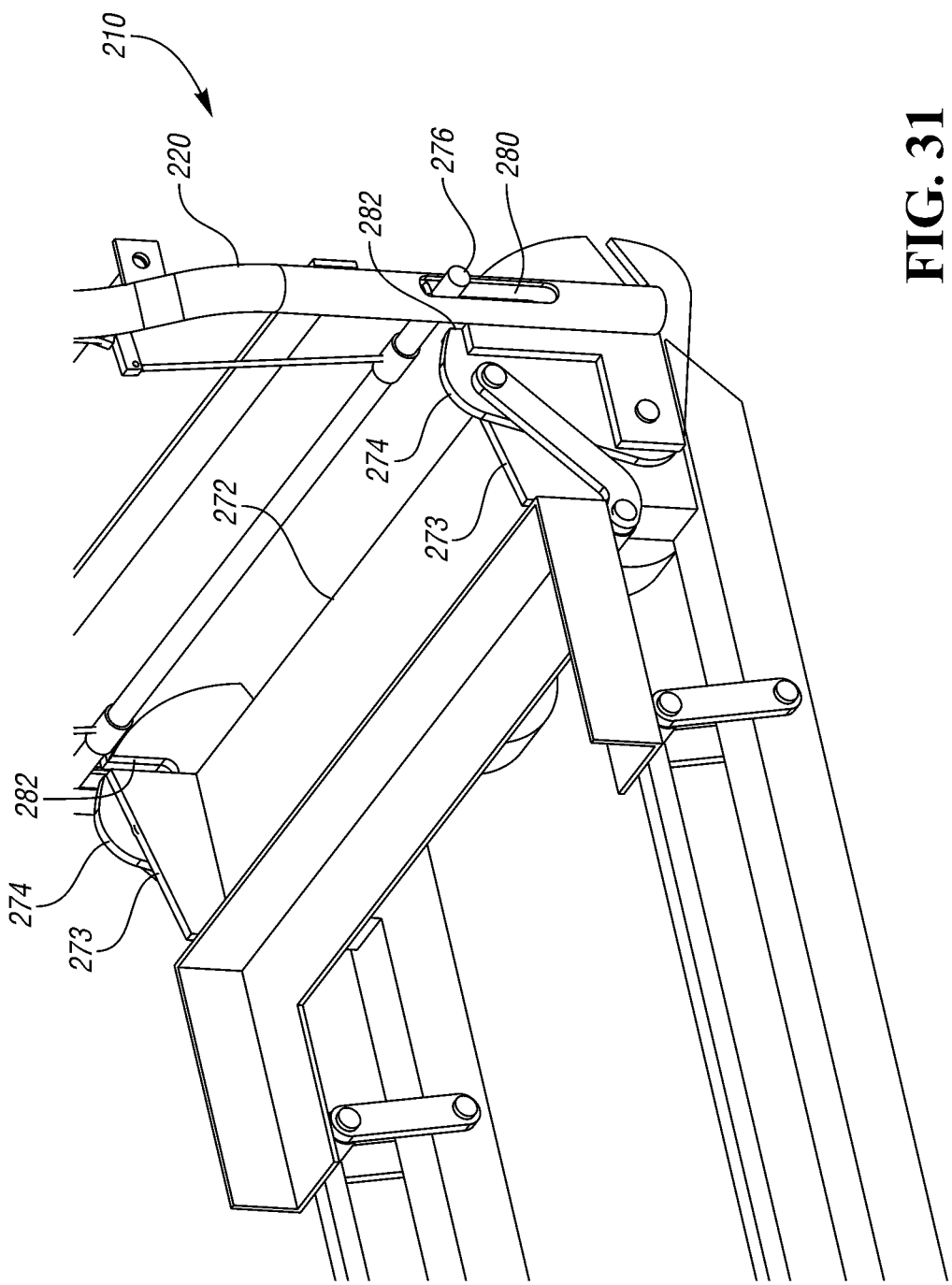
FIG. 31 is a view similar to that of FIG. 30 with the handle pivoted rearward to the upright position and still disengaged, with the upper frame in the lifted position.
Figure 32:
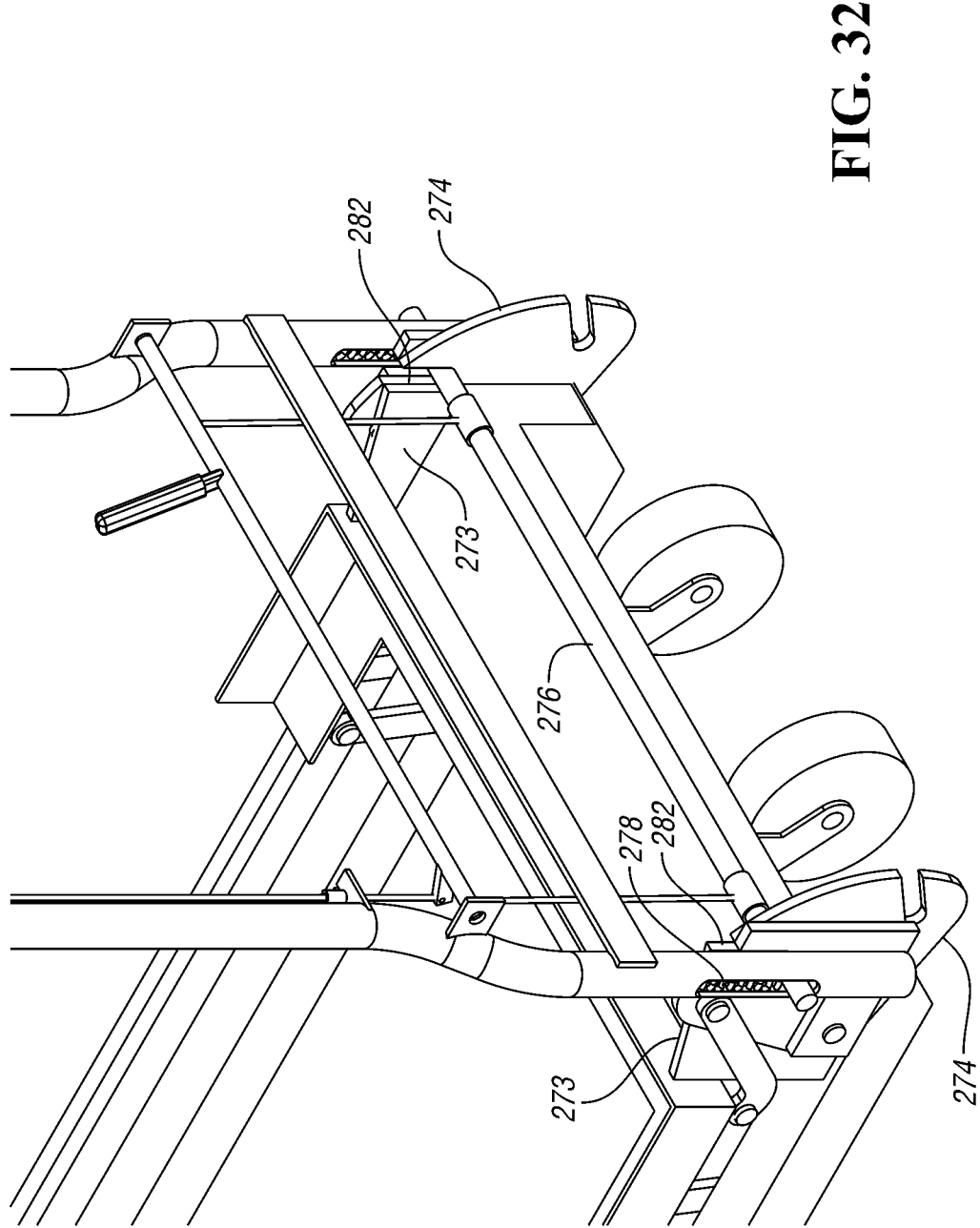
FIG. 32 is a front perspective enlarged view of the lift mechanism of FIG. 31, with the handle engaged.

The index crossbar 276 is then raised by pivoting the handle lever 286 (FIG. 25) until the index crossbar 276 is moved to the upper ends of the openings 280 in the handle 220, compressing the springs 278, and out of the low notches 277 of the ratchet plates 274 as shown in FIG. 30. The handle 220 can then be pivoted rearward to an upright position as shown in FIG. 31. The handle lever 286 (FIG. 25) can then be released so that the index crossbar 276 is biased downward into the high notches 282 of the ratchet plates 274 as shown in FIG. 32. This locks the upper frame 214 in the lifted position and locks the handle 220 in the upright position. Alternatively, the index crossbar could be a pair of pins that extend and retract in and out of holes in the ratchet plates 274.

To lower the upper frame 214 from the lifted position to the lowered position, the process can be reversed. The index crossbar 276 is disengaged from the high notches 282 of the ratchet plates 274 and the handle 220 is pivoted to align the index crossbar 276 with the low notches 277, where it is then secured. The handle 220 can then be pivoted upward and rearward, to pivot the upper frame 214 rearward and downward.

Figure 33:
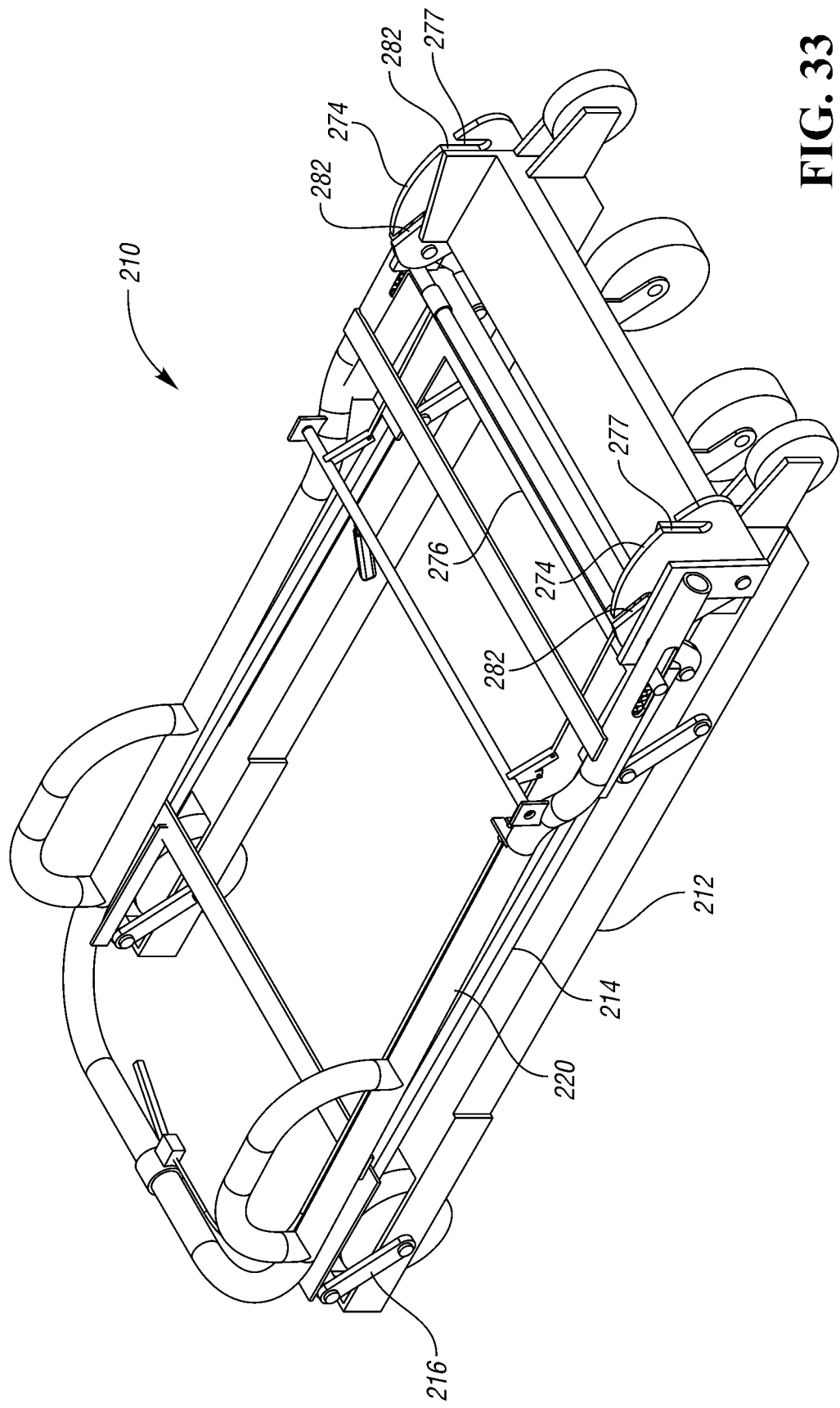
FIG. 33 is a front perspective view of the pallet sled of FIG. 25 in the folded or collapsed position.
Figure 34:
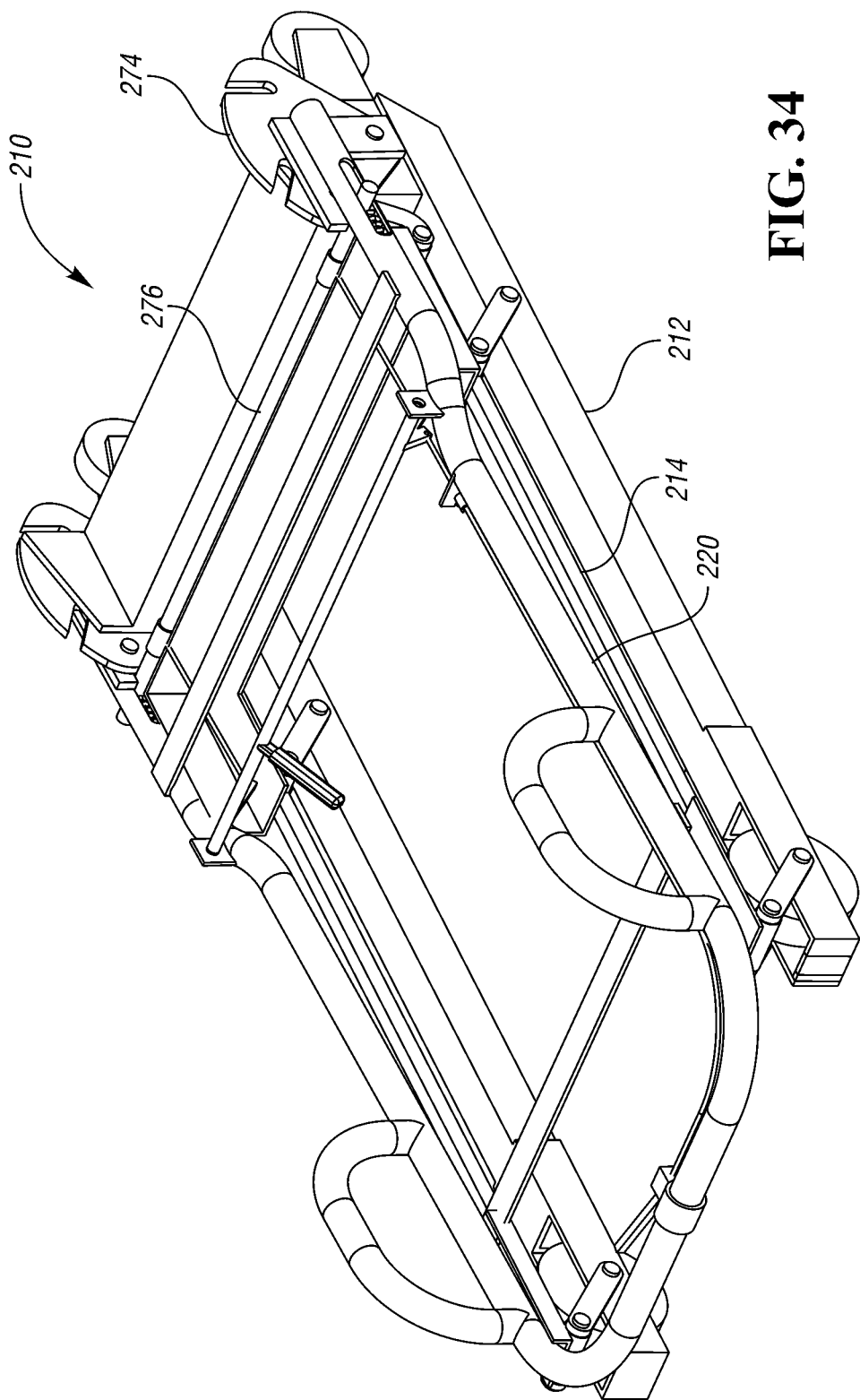
FIG. 34 is a rear perspective view of the pallet sled of FIG. 33.

The pallet sled 210 can also be folded as shown in FIGS. 33 and 34. The index crossbar 276 is moved upward out of the low notches 277 of the ratchet plates 274 and the handle 220 is pivoted all the way rearward (past the high notches 282), until the handle 220 rests on the upper frame 214. In this folded position, the pallet sled 210 occupies less volume and can be more easily shipped and stored.

Figure 35:
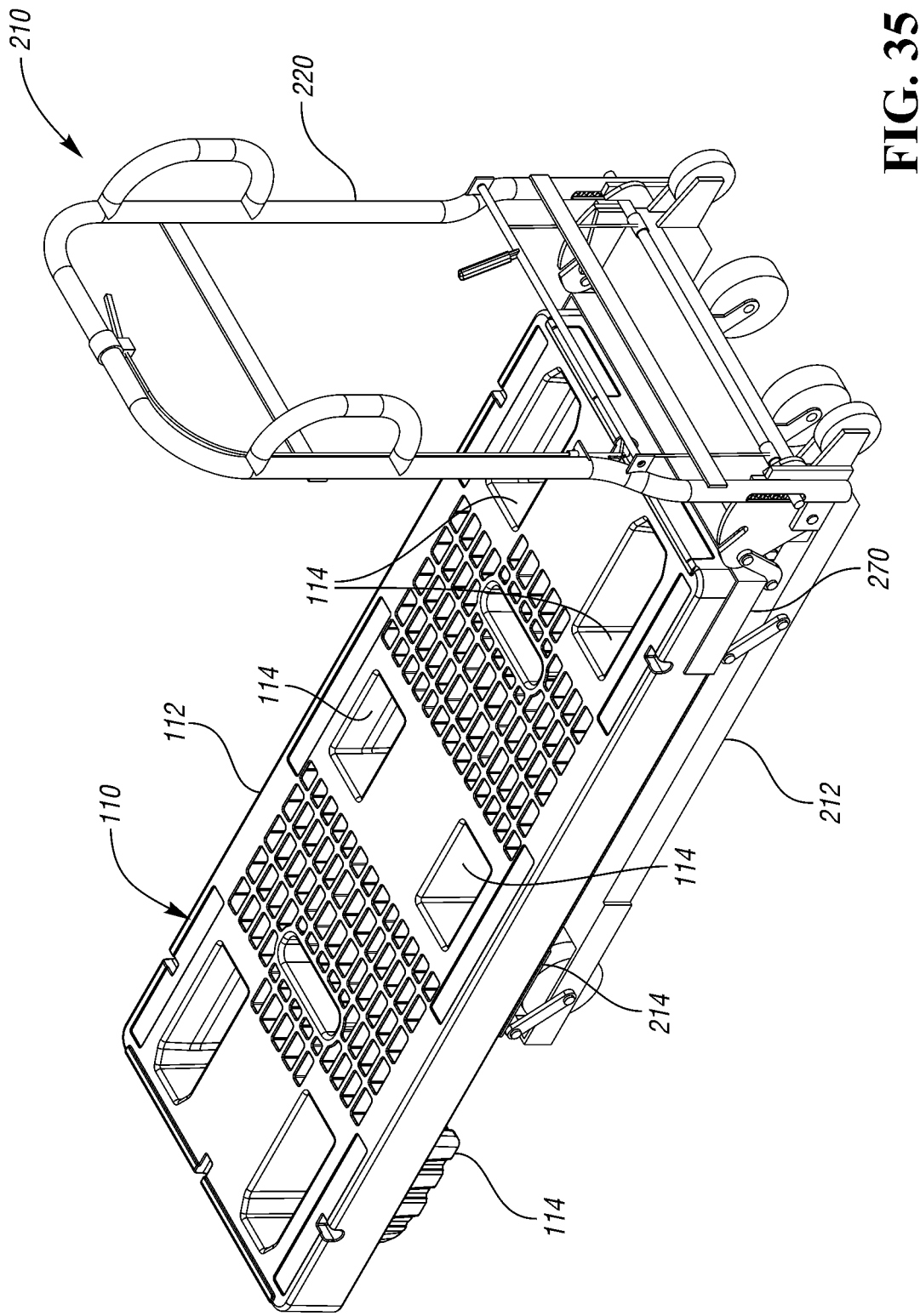
FIG. 35 is a front perspective view of the pallet sled of FIG. 25 positioned under a pallet, with the upper frame in the lowered position.
Figure 36:
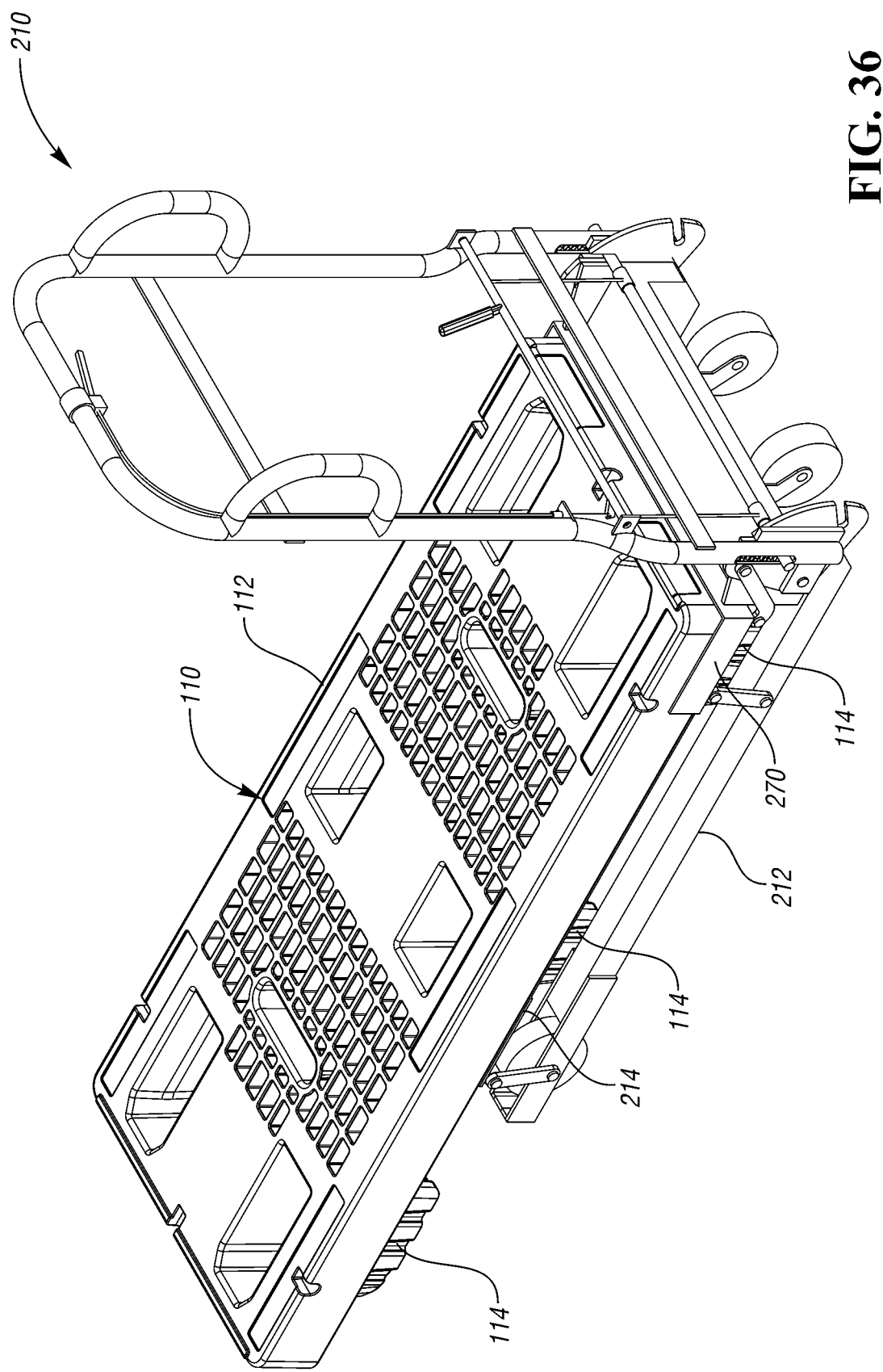
FIG. 36 shows the pallet sled and pallet of FIG. 35 after the upper frame has been moved to the lifted position.

In use, the pallet sled 210 is placed in the lowered position, with the upper frame 214 lowered close to the lower frame 212. The pallet sled 210 can then be rolled under a pallet 110 as shown in FIG. 35. The feet 114 of the pallet 110 are received between the arms 213, 215 of the lower frame 212 and upper frame 214, respectively. The upper frame 214 and cradle 270 are positioned below the deck 112, outward of the feet 114. The upper frame 214 is the moved to the lifted position in the manner described above by pivoting the handle 220 forward. The handle 220 is then pivoted rearward and engaged as shown in FIG. 36. In FIG. 36, the feet 114 of the pallet 110 are lifted off the floor and the pallet 110 is supported by the upper frame 214 and the cradle 270. The handle 220 is engaged in the upright position. The pallet sled 210 can be pushed or pulled by the handle 220 to move the pallet 110 (which would be loaded with goods in use).

FIG. 37 is a side view of the pallet sled 210 and pallet 110 of FIG. 36. As shown, the feet 114 are lifted off the floor so that the pallet 110 can be moved by the pallet sled 210.

The sleds 10, 210 each provide a small, lightweight manual, non-powered lift for lifting pallets 110. The sleds 10, 210 can be used to deliver loaded pallets 110 into stores, such as into store refrigerator or freezers, because the sleds 10, 210 are small and maneuverable.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet sled comprising:
   an upper frame having an upper surface;
   a lower frame supporting the upper frame;
   a plurality of pivotable arms connecting the lower frame to the upper frame;
   a handle pivotably connected to the lower frame and the upper frame, such that pivoting the handle selectively raises and lowers the upper frame relative to the lower frame;
   at least one ratchet plate pivotably coupled to the lower frame, to the handle, and to the upper frame; and
   an indexing bar movable between an engaged position in which the indexing bar prevents relative rotation of the handle relative to the at least one ratchet plate and a disengaged position in which the handle can pivot relative to the at least one ratchet plate, such that the handle can raise and lower the upper frame by pivoting relative to the lower frame when the indexing bar is in the engaged position and such that the handle can pivot relative to the lower frame without raising or lowering the upper frame when the indexing bar is in the disengaged position.

2. The pallet sled of claim 1 wherein the at least one ratchet plate is pivotably secured directly to the lower frame and the upper frame.

3. The pallet sled of claim 1 wherein the indexing bar extends through elongated openings in a pair of vertical portions of the handle.

4. The pallet sled of claim 3 further including wheels supporting the lower frame.

5. The pallet sled of claim 4 wherein the at least one ratchet plate includes a low notch which is engaged by the indexing bar to place the upper frame in a low position, and wherein the at least one ratchet plate includes a high notch which is engaged by the indexing bar to place the upper frame in a lifted position.

6. The pallet sled of claim 5 wherein a lower portion of the at least one ratchet plate is pivotably secured to the lower frame at an axis below the upper surface of the upper frame when the upper frame is in the lifted position.

7. The pallet sled of claim 4 further including at least one spring biasing the indexing bar toward the engaged position.

8. The pallet sled of claim 7 wherein the at least one ratchet plate includes two ratchet plates.

9. The pallet sled of claim 8 wherein each of the two ratchet plates includes a plurality of teeth selectively engageable with the indexing bar.

10. The pallet sled of claim 1 in combination with a pallet having a plurality of feet supporting a deck, the plurality of feet received within the upper frame, the deck supported on the upper frame.

11. The pallet sled of claim 1 further including at least one spring biasing the indexing bar toward the engaged position.

12. A pallet sled comprising:
    an upper frame having an upper surface;
    a lower frame supporting the upper frame;
    a pair of ratchet plates coupling the lower frame to the upper frame, the ratchet plates pivotable relative to the lower frame, wherein the ratchet plates are pivotable between a first position and a second position, wherein the upper frame is closer to the lower frame in the second position than in the first position; and
    a handle pivotably connected to the lower frame, wherein the handle is selectively engagable and disengageable with the ratchet plates, such that the handle can raise and lower the upper frame by pivoting relative to the lower frame when the handle is engaged and such that the handle can pivot relative to the lower frame without raising or lowering the upper frame when the handle is disengaged.

13. The pallet sled of claim 12 wherein the handle is configured to engage the ratchet plates in a first relative position between the handle and ratchet plates and a second relative position between the handle and ratchet plates.

14. The pallet sled of claim 13 further including an indexing bar movable between an engaged position in which the indexing bar engages the handle to at least one of the ratchet plates and a disengaged position in which the handle is disengaged from the at last one of the ratchet plates.

15. The pallet sled of claim 14 wherein the indexing bar extends through elongated openings in a pair of vertical portions of the handle.

16. The pallet sled of claim 15 further including wheels supporting the lower frame.

17. The pallet sled of claim 16 in combination with a pallet having a plurality of feet supporting a deck, the plurality of feet received between spaced-apart arms of the upper frame, the deck supported on the upper frame.

18. The pallet sled of claim 13 wherein the pair of ratchet plates are pivotably secured to the lower frame and to the upper frame.

19. The pallet sled of claim 12 in combination with a pallet having a plurality of feet supporting a deck, the plurality of feet received between spaced-apart arms of the upper frame, the deck supported on the upper frame.

20. A pallet sled comprising:
    an upper frame;
    a lower frame supporting the upper frame;
    a plurality of wheels supporting the lower frame;
    a ratchet plate pivotably connected to the lower frame about an axis, the ratchet plate pivotably coupled to the upper frame, wherein the ratchet plate is pivotable between a first position and a second position, wherein the upper frame is closer to the lower frame in the second position than in the first position; and
    a handle pivotably connected to the lower frame about the axis, wherein the handle is selectively engagable and disengageable with the ratchet plate, such that the handle can raise and lower the upper frame by pivoting relative to the lower frame when the handle is engaged and such that the handle can pivot relative to the lower frame without raising or lowering the upper frame when the handle is disengaged.

21. The pallet sled of claim 20 wherein the axis is parallel to the lower frame.

22. The pallet sled of claim 20 in combination with a pallet having a plurality of feet supporting a deck, the plurality of feet received between spaced-apart arms of the upper frame, the deck supported on the upper frame.

* * * * *